United States Patent [19]

Stone et al.

[11] Patent Number: 5,415,949
[45] Date of Patent: May 16, 1995

[54] METAL-AIR CELL AND POWER SYSTEM USING METAL-AIR CELLS

[75] Inventors: Gordon R. Stone, O'Fallon, Ill.; Richard L. McGee, Chesterfield, Mo.; Douglas J. Amick, Ann Arbor, Mich.

[73] Assignee: Voltek, Inc., Belleville, Ill.

[21] Appl. No.: 955,583

[22] Filed: Oct. 2, 1992

[51] Int. Cl.⁶ .................. H01M 8/04; H01M 8/08; H01M 8/24
[52] U.S. Cl. .................. 429/63; 429/22; 429/23; 429/24; 429/25; 429/27; 429/28; 429/61; 429/62; 429/64; 429/70
[58] Field of Search .............. 429/22, 23, 24, 25, 429/27, 28, 61-64, 70

[56] References Cited

U.S. PATENT DOCUMENTS

| | | | |
|---|---|---|---|
| 3,513,030 | 5/1970 | Rosansky et al. | 136/86 |
| 3,513,031 | 5/1970 | Zaromb | 136/86 |
| 3,650,839 | 3/1972 | Lang et al. | 429/27 |
| 3,980,498 | 9/1976 | Urbach et al. | 429/64 |
| 4,081,693 | 3/1978 | Stone | 307/66 |
| 4,246,324 | 1/1981 | de Nora et al. | 429/17 |
| 4,756,980 | 7/1988 | Niksa et al. | 429/27 |
| 4,842,964 | 6/1989 | Tarcy | 429/52 |
| 4,885,217 | 12/1989 | Hoge | 429/27 |
| 4,906,535 | 3/1990 | Hoge | 429/42 |
| 4,908,281 | 3/1990 | O'Callaghan | 429/27 |
| 4,910,102 | 3/1990 | Rao et al. | 429/51 |
| 4,950,561 | 8/1990 | Niksa et al. | 429/27 |
| 5,032,473 | 7/1991 | Hoge | 429/42 |
| 5,053,375 | 10/1991 | Rao | 502/101 |

OTHER PUBLICATIONS

"Aluminum-Air Battery Development: Toward an Electric Car", Energy and Technology Review, 1983, pp. 20-33.
Geoff Scamans, "Advances in Battery Technology", Chemistry and Industry, Mar. 17, 1986.
Nigel Fitzpatrick and Geoff Scamans, "Aluminum if a Fuel for Tomorrow", New Scientist, Jul. 1, 1986, pp. 34-37.
Nigel Fitzpatrick and David Strong, "Aluminum-Air, a Battery/Battery Hybrid for an Off-Road Vehicle", Nov. 1988.
D. W. Parish et al., "Demonstration of Aluminum-Air Fuel Cells in a Road Vehicle", SAE Technical Paper Series 891690, 1989, pp. 65-69.
"High Energy Density Disposable Aluminum-Air Battery" by Alupower, Inc., Jun. 1992.
"Mechanically Rechargeable, Metal-Air Batteries For Automotive Propulsion", John F. Cooper and Ernest L. Littauer, UCRL-81178, May 26, 1978.
"Aluminum-Air Battery Cell Hardware Development", Lockheed Palo Alto Research Laboratories, LMSC-D856914, Apr. 30, 1982.
"Current Status of the Development of the Refuelable Aluminum-Air Battery", J. F. Cooper, K. A. Kraftick, and B. J. McKinley, UCRL-89155, May 10, 1983.
"Aluminum-Air Power Cell Research and Development Progress Report", John F. Cooper, U.S. Dept. of Commerce, Lawrence Livermore Laboratory, UCRL-53536, Dec. 1984.

*Primary Examiner*—Johann Richter
*Assistant Examiner*—Michael B. Hydorn
*Attorney, Agent, or Firm*—Senniger, Powers, Leavitt & Roedel

[57] ABSTRACT

A metal air cell comprising a flexible, recloseable, pouch made of a gas-permeable, electrolyte-impermeable, material forming the cathode of the cell, a metal plate anode in the pouch, and spacers physically isolating the anode from the interior of the flexible pouch cathode, the spacers separating the anode and the cathode by a predetermined spacing. A plurality of such cells are preferably stacked into a multicell battery, and compressed in a harness to maintain proper anode-cathode spacing as the anode is consumed. The stack can be incorporated as a replaceable part of a larger power system including a circulatory system for circulating an electrolyte solution through the cells in the stack. A controller controls the circulatory system, particularly during start-up and shut-down, to achieve a fast start up, and an efficient shut down.

46 Claims, 14 Drawing Sheets

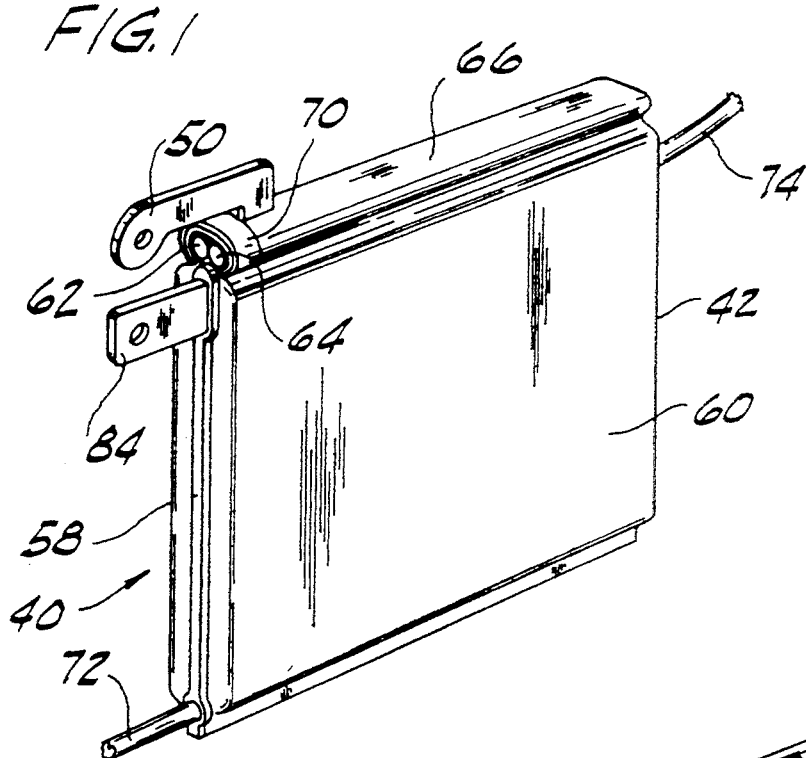
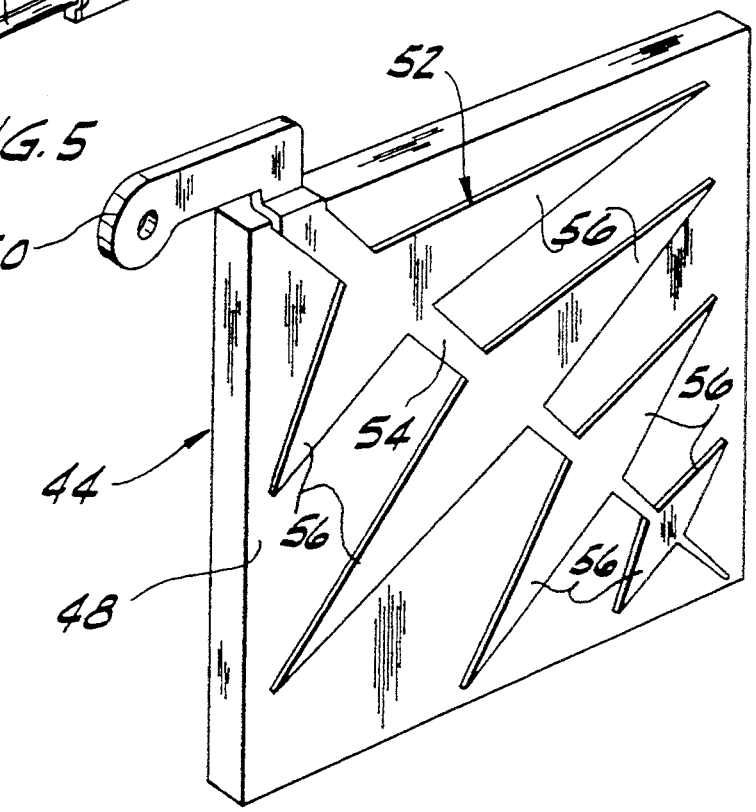

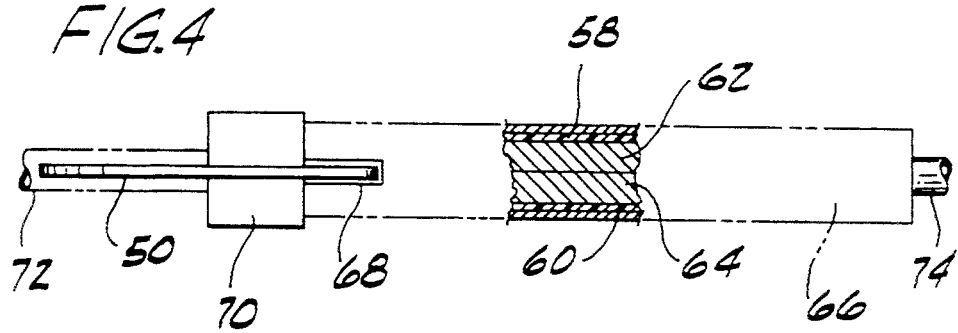
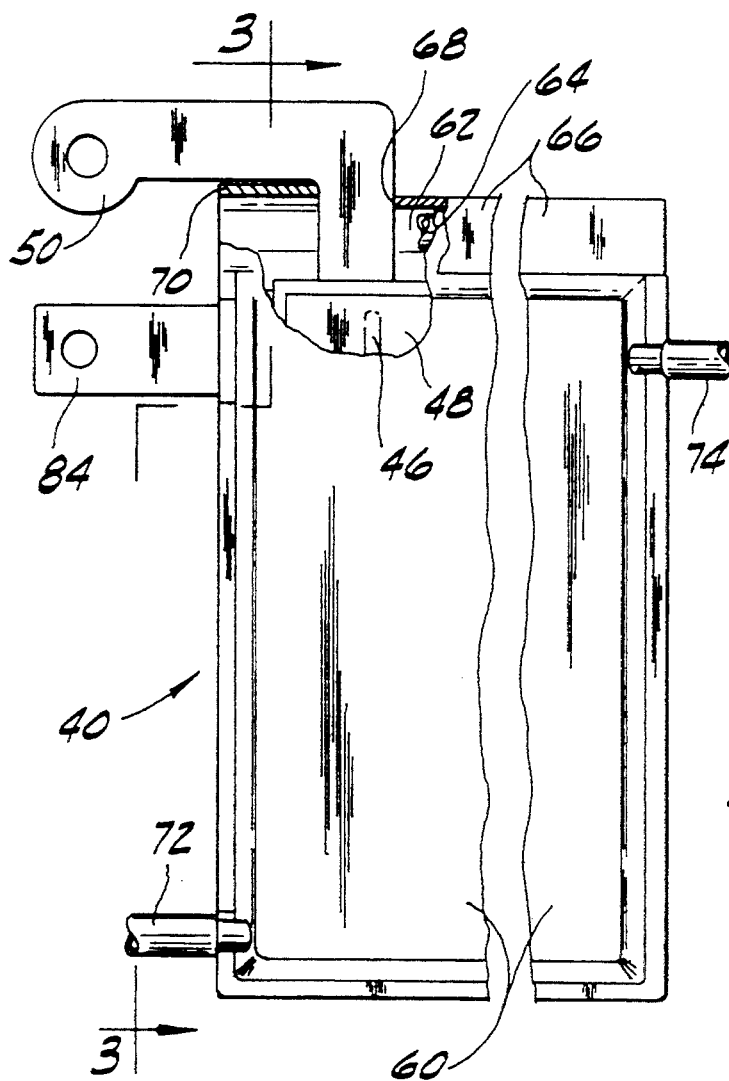

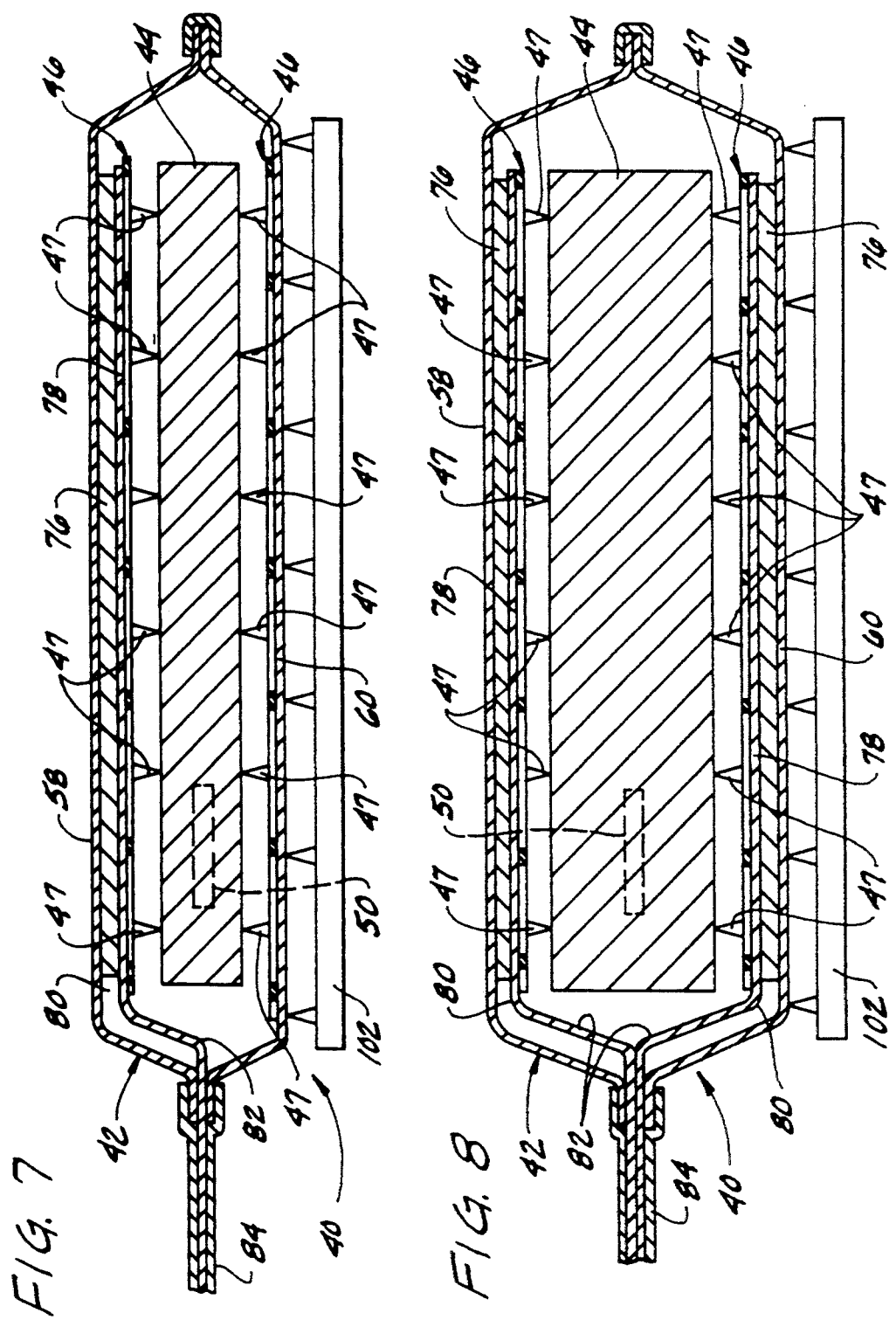

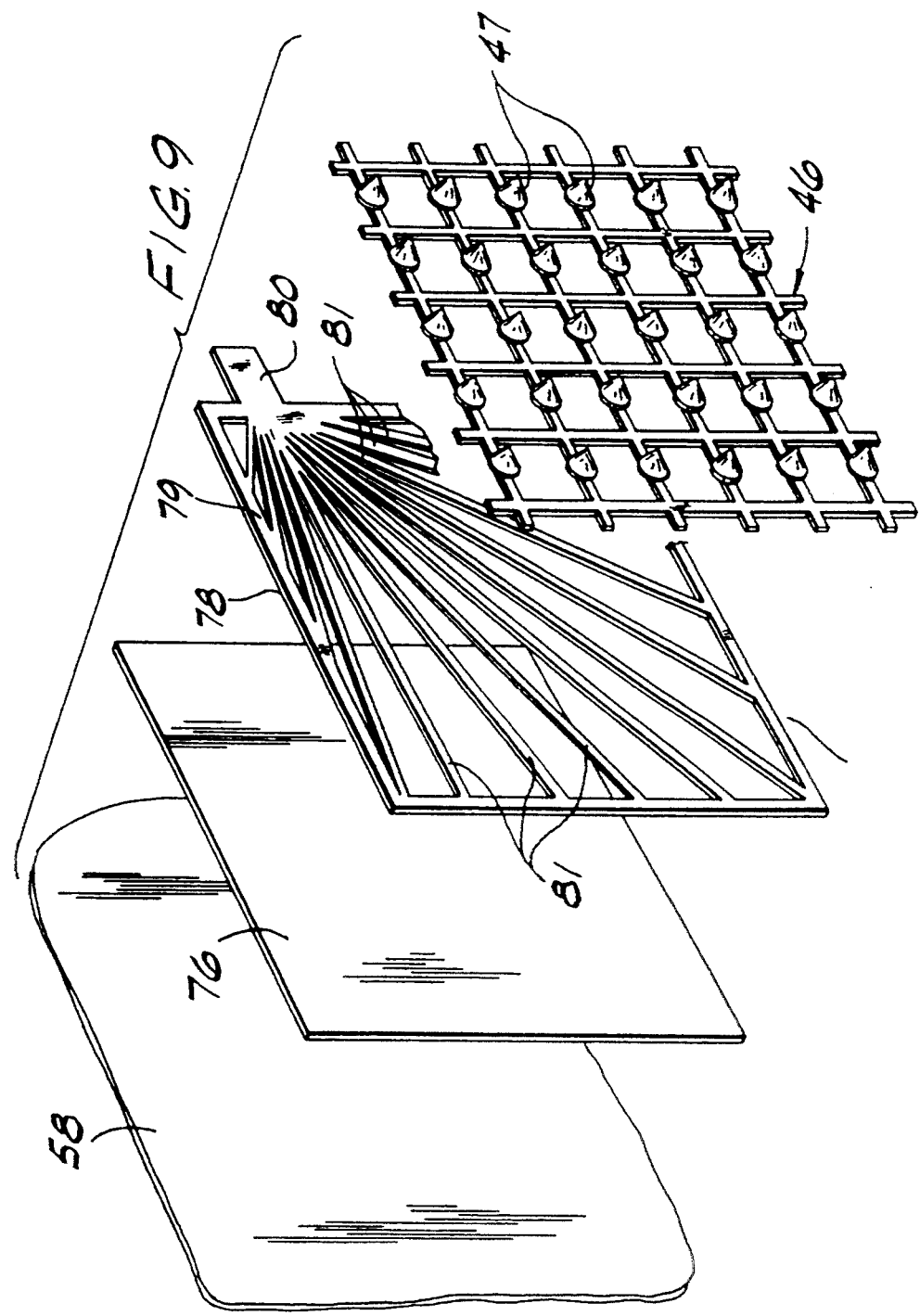

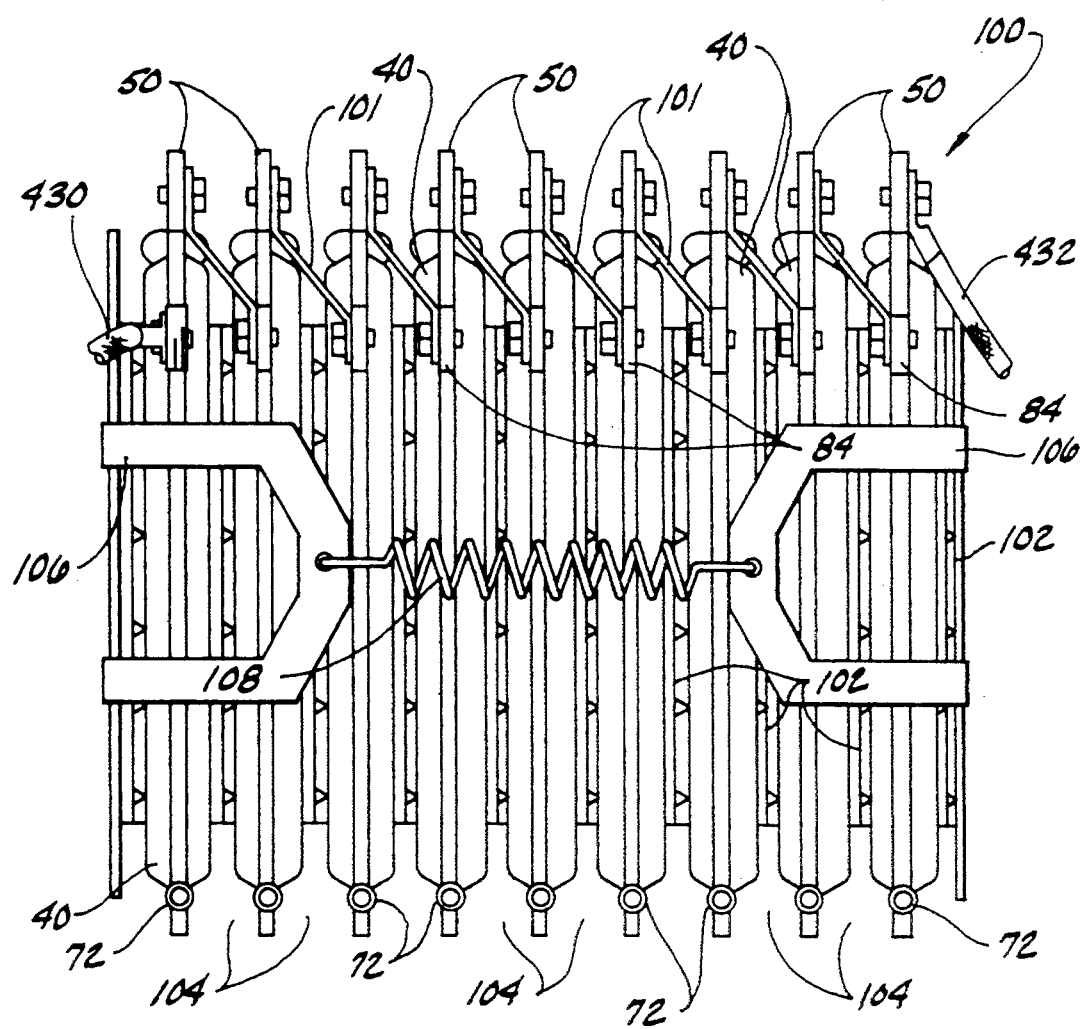

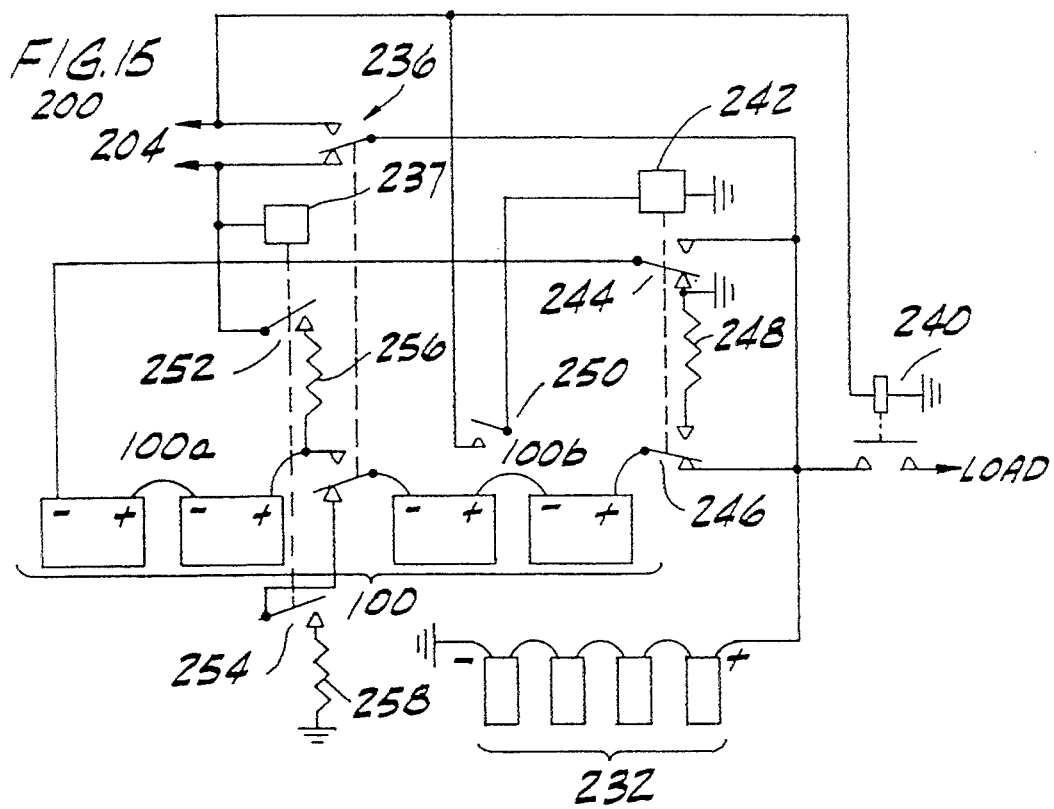
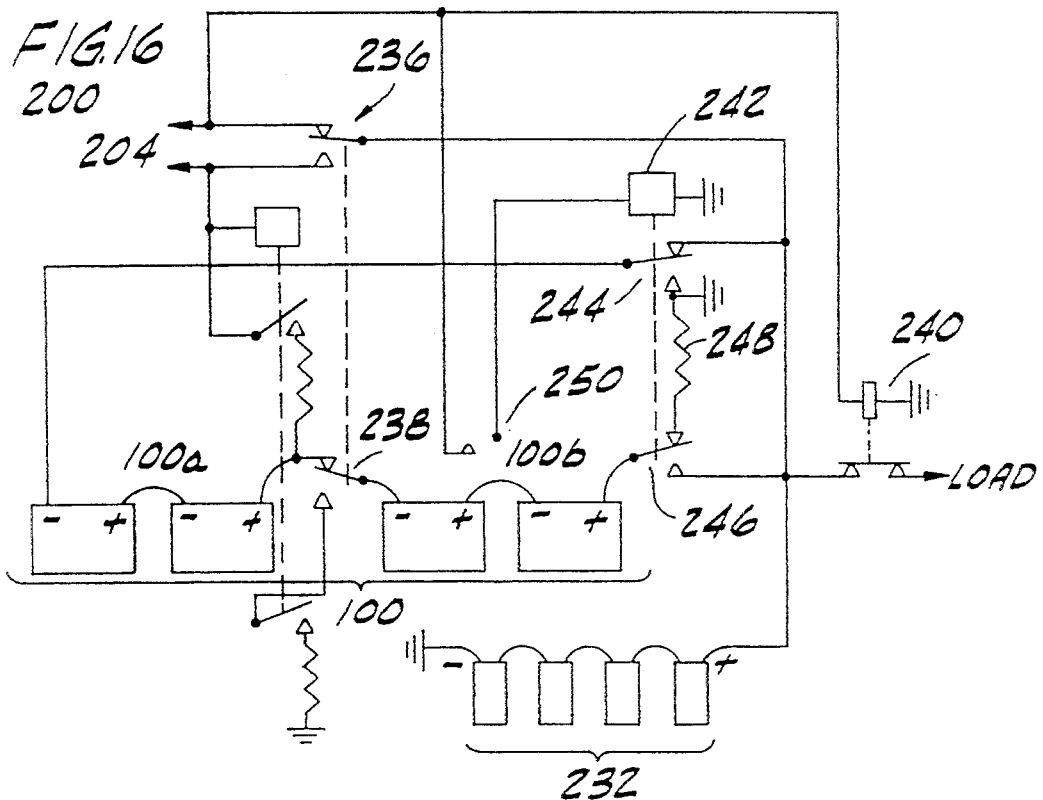

METAL-AIR CELL AND POWER SYSTEM USING METAL-AIR CELLS

BACKGROUND AND SUMMARY OF THE INVENTION

This invention relates to metal-air cells, and to a power system using metal-air cells.

Metal-air cells are well-known primary cells having an anode of a reactive metal, such as aluminum or magnesium, and an air cathode spaced in close proximity to, but not touching, the anode. A suitable electrolyte is circulated through the cell to electrochemically couple the anode and cathode, releasing electrons and creating a potential that results in the flow of current when the cell is connected across a load. During these reactions, the anode is consumed.

Several difficulties have interfered with the practical application of metal air cells in large power systems. One of these difficulties is in "refueling" or replenishing the cell after the anode is consumed. In the past, the refueling process was time consuming, and often resulted in substantial down time. Another of these difficulties was the problem of cell voltage degradation as the anode was consumed. Consumption of the anode caused the anode-cathode spacing in the cell to change. Moreover, in the extreme, consumption of the anode caused a loss of structural and electrical integrity. Another difficulty was degradation of the electrolyte solution. As the reaction in the cell proceeded, reaction products built up in the electrolyte solution, and concentration of the electrolyte decreased, both of which caused a decrease in performance of the cell. Still another difficulty with metal-air cells has been slow start up and difficulty in turning the cells off. Optimum operating electrolyte temperature for most metal air cells is relatively high, typically about 130° F. to 150° F. Metal-air cells generate low power at low temperatures, and thus in prior art it could take several minutes before cell operation would warm up the circulating electrolyte to a satisfactory operating temperature. Moreover, once the cell was turned on it was difficult to turn off the cell and prevent further consumption of the anode to preserve the life of the cell.

Generally, the metal air cell of the present invention comprises a flexible, recloseable, pouch made of a gas-permeable, electrolyte-impermeable, material which forms the cathode of the cell. There is a metal plate anode in the pouch, and spacers physically isolating the anode from the interior of the flexible pouch cathode, separating the anode and the cathode by a predetermined spacing. The pouch is preferably formed from two panels of a gas-permeable, electrolyte-impermeable, material joined together at their respective bottom and side edges to form a pouch, open at the top to provide access to the pouch. There are elongated, resilient sealing beads on each panel along each side of the opening of the pouch. A clamp releasably compresses the sealing beads together to close and seal the top edges of the panels to close the pouch. This recloseable opening in the pouch cathode allows the anode to be conveniently replaced after it has been consumed. The pouch has an inlet and an outlet for circulation of an electrolyte through the cell. The electrolyte may be a solution of KOH, NaOH, or NaCl, or some other suitable material.

A plurality of such cells can be stacked to form a multi-cell battery. The stack is preferably surrounded by a harness with a spring for tensioning the harness to compress the cells to maintain the predetermined anode-cathode spacing determined by the spacers in the cell, as the anode in each cell is consumed. There are preferably air gap spacers between each cell in the stack for separating the individual cells with an air gap. These spacers are sized so that the size of the air gap between the cells may vary from cell to cell to provide variable cooling of the cells.

The anode plate is preferably a substantially flat metal plate with a highly conductive terminal extending therefrom, and may have a raised dendritic pattern thereon. The dendritic pattern comprises a tapering main stem that starts at the conductive terminal and extends substantially across the plate, and a plurality of tapering branches extending from the main stem. This pattern provides additional structural integrity and electrical communication across the anode plate to the terminal, even as the metal in the plate is consumed.

The power system of this invention preferably comprises a stack of such metal-air cells and a circulatory system for delivering an electrolyte solution to the inlets of the cells, and removing the electrolyte solution and chemical reaction products from the outlets of the cells. The circulatory system includes a pump, and a controller for controlling the operation of the power system. The circulatory system preferably includes a sensor for monitoring the concentration of electrolyte in the electrolyte solution circulating in the circulatory system, and an injector, such as a solenoid-controlled valve, responsive to the sensor, for injecting additional electrolyte into the circulatory system when the concentration of electrolyte in the solution drops below a predetermined minimum. The sensor preferably monitors electrolyte concentration by monitoring the conductivity or pH of the electrolyte. The circulatory system may also include a sump with baffles for trapping solid particles that form in the electrolyte solution, and/or an electrolyte filter for removing particles from the circulating electrolyte solution.

The circulatory system preferably also comprises a heat exchanger through which the electrolyte solution can be circulated to lower its temperature, and a sensor for monitoring the temperature of the electrolyte solution circulating in the circulatory system. The controller can direct electrolyte solution through the heat exchanger when the temperature of the solution reaches a predetermined temperature. Alternatively, and preferably, the electrolyte solution can circulate continuously through the heat exchanger, and the system can further comprise a cooling fan for forcing cooling air over the heat exchanger, and the controller can simply operate the fan in response to the sensor for monitoring the temperature of the electrolyte solution circulating in the circulatory system.

The power system preferably also includes a supplemental battery, connected in parallel with the stack, to provide electrical power to start system operation and to provide electrical power throughout shut-down. The supplemental battery can be sized to provide supplementary power to the power system during periods of peak current demand, and for providing operating power for the system, including the pump, sensors, and controller.

The electrolyte solution is preferably initially stored in a sump connected to the circulatory system. There are preferably temperature sensors in at least one of the cells, and in the circulatory system. When the power system is turned on, the controller determines whether the system temperature exceeds a critical start temperature, $T_s$. If the system temperature is greater than $T_s$, the controller turns the circulatory system on to continuously circulate electrolyte; if the system temperature is less than $T_s$, the controller initially turns on the circulatory system for a first predetermined period of time $t_1$, to fill the cells with electrolyte solution, and then turns off the circulatory system for a second predetermined period of time $t_2$. The controller then monitors the temperature of the electrolyte solution in at least one of the cells through the temperature sensor $t_1$ in the cell. If the cell temperature is less than a predetermined minimum $T_1$, the controller reactivates the circulatory system for the first predetermined time to exchange the electrolyte solution in the cells, and then turns off the circulatory system for the second predetermined period $t_2$, and repeats this pulse on and pulse off operation until the cell temperature exceeds the predetermined cell temperature $T_1$. When the cell temperature exceeds $T_1$ the controller then determines whether the system temperature exceeds $T_s$. If the temperature does exceed $T_s$, the circulatory system remains on continuously; if the temperature does not exceed $T_s$, the control system resumes the pulse on and pulse off operation until the controller again determines that the cell temperature exceeds $T_1$.

The controller also operates immediately after the power system is turned off to cause the circulatory system to draw the electrolyte from the cells, to thereby preserve the anodes. However, when the power system is initially turned off the controller preferably connects the supplemental battery across the stack with reverse polarity for a predetermined time to inhibit electron flow and so preserve the anodes in the cells. This holds the power system in a ready state, in case the power system is turned on again. If the power system is not turned on again within the predetermined time, the controller then causes the circulatory system to draw the electrolyte from the cells.

The stack is preferably provided as a separate, replaceable component of the system. Thus, when the anodes are expended, the stack can simply be replaced. The depleted stack can be replenished by opening each cell within the stack and installing new anodes.

This invention also relates to a method of starting up a power source comprising a plurality of metal-air cells and a circulatory system for circulating an electrolyte solution through the cells. Before start-up, the cells are substantially empty of electrolyte solution. Generally, the method comprises the steps of comparing the system temperature to a critical start temperature $T_s$. If the system temperature exceeds the critical start temperature $T_s$, the controller turns on the circulatory system to operate continuously to circulate the electrolyte solution. If the system temperature does not exceed the critical start temperature $T_s$, the controller turns on the circulatory system for a first predetermined period of time $t_1$ to fill the cells with electrolyte solution, and turns off the circulatory system for a second predetermined period of time $t_2$. The controller then monitors the temperature of the electrolyte solution in at least one of the cells. If the cell temperature is less than a predetermined temperature $T_1$, the controller turns on the circulatory system for the first predetermined time $t_1$ to exchange the electrolyte solution in the cells, turns the circulatory system off for the second predetermined period of time $t_2$, and repeats the pulse on/pulse off operation until the cell temperature exceeds the predetermined minimum $T_1$. When the cell temperature exceeds $T_1$, the controller determines whether the system temperature exceeds $T_s$. If so the controller turns on the circulatory system for continuous operation; if not the controller continues the pulse on/pulse off operation of the circulatory system until the cell temperature again exceeds $T_1$.

The method of controlling a power system according to the this invention can also include the steps of monitoring the concentration of electrolyte in the electrolyte solution and injecting additional electrolyte into the electrolyte solution when the concentration drops below a predetermined minimum. The method may further comprise the steps of monitoring the temperature of the electrolyte circulating in a circulatory system that includes a heat exchanger with a cooling fan, and turning on the cooling fan when the temperature of the electrolyte solution exceeds a first predetermined temperature and turning off the cooling fan when the temperature of the electrolyte solution is less than a second predetermined temperature.

The metal-air cell of this invention provides easy access to the anode in the pouch cathode so that the cell can be quickly and conveniently replenished with a replacement anode. The flexibility of the pouch cathode allows the cell to be compressed to maintain the precise anode-cathode spacing determined by the spacers, maintaining the cell's optimum performance. The variable inter-cell spacing in the stack provides for optimum circulation of depolarizing and cooling air between the cells maximizing their individual performance.

The power system optimizes performance of the cells. Monitoring of the concentration of the electrolyte in the electrolyte solution, and replenishment of the electrolyte, optimizes cell performance. Use of a sump and/or a filter to remove solids and reaction products from the circulating electrolyte solution maintains the quality of the electrolyte solution, maximizing performance of the cells. The use of a controller and a temperature sensor to either circulate the electrolyte solution through a heat exchanger, or to control the heat exchanger fan, helps to maintain the electrolyte solution at optimum temperature to maximize performance of the cells.

The start up controller provides quick start up of the power system when it is turned on when the system is cold. The pulse-on start up sequence in which the electrolyte is circulated a first predetermined period and retained in the cells for a second predetermined time more quickly brings the electrolyte solution to the optimum operating temperature. The controller also provides economical shut-down when the system is turned off. The controller initially provides a reverse bias voltage to the stack for a predetermined period, to retard further consumption of the anode, while retaining the system in a ready state for reactivation. After the predetermined period, the controller causes the circulatory system to drain the electrolyte solution from the cells to protect the anodes.

The method of controlling a metal-air cell power system of this invention provides for rapid start up, quickly bringing the electrolyte solution to optimum operating temperature. The method also maintains the electrolyte concentration, purity, and temperature of the electrolyte solution, optimizing performance of the power system. Finally, the method provides for efficient shut-down, providing a dwell period during which the anodes are protected from further consumption but the cells are ready for immediate use, and a shut down period in which the electrolyte is drained from the cells to protect the anodes from further consumption.

System start-up can be facilitated by the application of a surge current at turn-on to both warm up the electrochemical cell and to help de-passivation of the anodes within the cells.

These and other features and advantages will be in part apparent and in part pointed out hereinafter.

BRIEF DESCRIPTION OF THE DRAWINGS

FIG. 1 is a perspective view of a metal-air cell constructed according to the principles of this invention;

FIG. 2 a front elevation view of the cell with portions broken away to reveal details of its construction;

FIG. 3 is an end elevation view of the cell with portions broken away to review details of its construction;

FIG. 4 is a top plan view of the cell broken away to show details of the seal and anode terminal penetration;

FIG. 5 is an elevation view of the anode plate;

FIG. 7 is a horizontal cross sectional view of a single cathode cell taken along the plane of line 7—7 in FIG. 2;

FIG. 8 is a horizontal cross-sectional view of an alternative dual cathode embodiment of the cell, similar to FIG. 7;

FIG. 9 is a perspective view of the catalytic substrate and the current collector;

FIG. 10 is a side elevation view of a stack of fresh cells;

FIG. 15 is a schematic diagram of the power system in the off position;

FIG. 16 is a schematic diagram of the power system during warm-up, immediately after being turned on;

Corresponding reference numerals indicate corresponding parts throughout the drawings.

DETAILED DESCRIPTION OF THE PREFERRED EMBODIMENT

Figure 6:
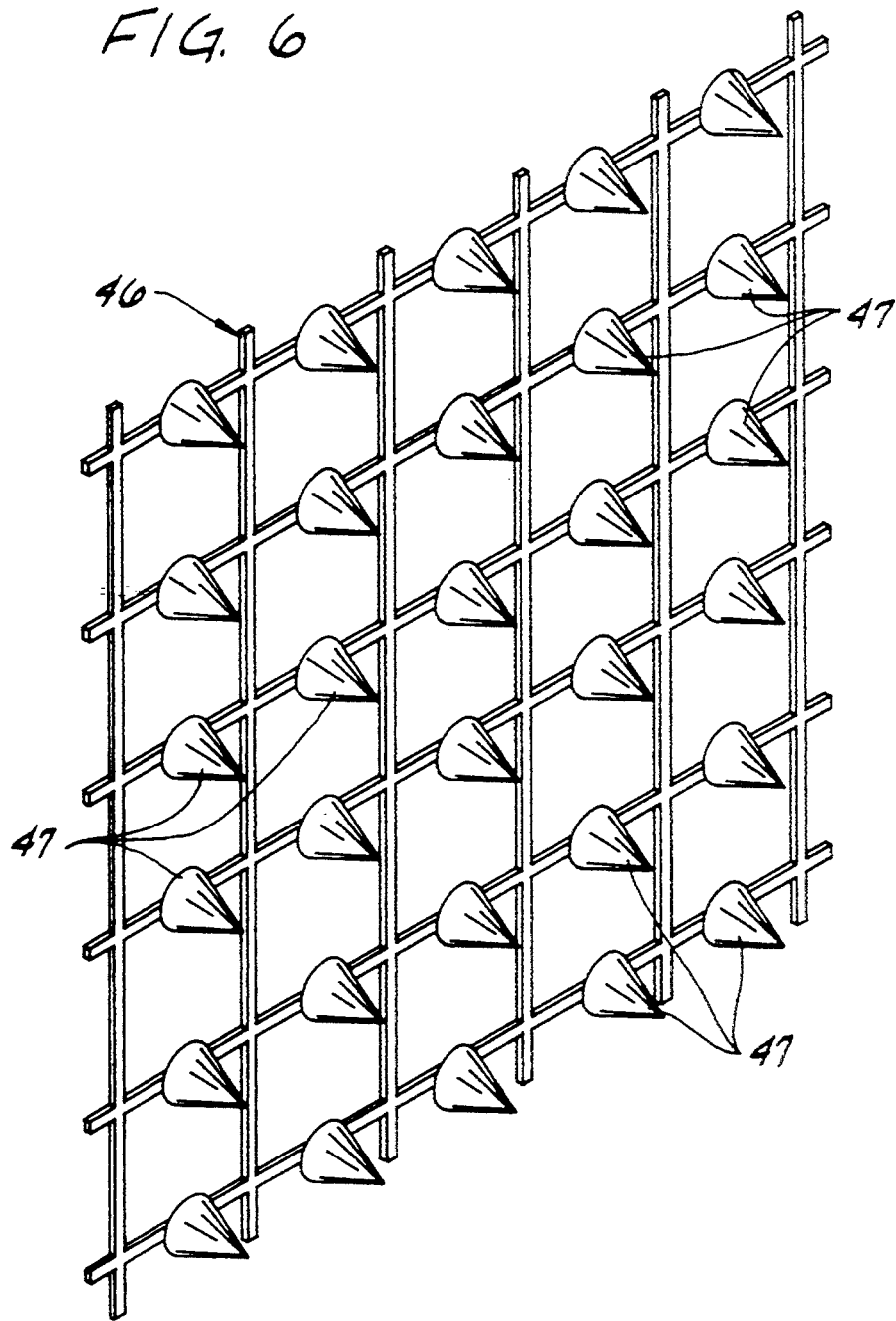
FIG. 6 is an elevation view of the anode-cathode spacer.

A metal-air cell constructed according to the principles of this invention is indicated generally as 40 in FIGS. 1-4. Cell 40 comprises a flexible, recloseable, pouch 42 made of a gas-permeable, electrolyte-impermeable, material forming the cathode of the cell. There is a metal plate anode 44 inside the pouch 42 and surrounded thereby. Spacers 46, shown in FIG. 6, are positioned on each side of the anode 44, to physically isolate the anode from the interior of the flexible pouch cathode 42, separating the anode from the cathode by a predetermined spacing, typically on the order of about 3 mm. As shown in FIG. 6, each spacer 46 preferably comprises a non-conducting lattice of criss-crossing members with cones 47 spaced on the lattice and positioned with respect to each other and designed so as to minimize loss of active surface of the anode while assuring uniform separation between the anode and cathode. As shown in FIG. 6, the elements of the spacers have a tapering cross section, minimizing their "foot print" on the active surface of the anode. Of course, the spacers 46 could take some other form, if desired. For example, pyramids could be used in place of cones 47 spacing elements could be provided directly on the cathode.

As shown in FIG. 5, anode 44 preferably comprises a substantially flat metal plate 48 with a highly conductive terminal 50 extending therefrom. In this preferred embodiment anode 44 is aluminum alloy, but the anode could be made of some other metal such as zinc or magnesium, depending upon the electrochemistry of cell 40. Plate 48 has at least one reaction face, but as described below, could have two reaction faces. In the case where the plate has just one reaction face, the other face can be provided with a raised dendritic pattern 52 thereon, comprising a tapering main stem 54 that starts at the conductive terminal 50 and extends substantially across plate 48, and a plurality of tapering branches 56 extending from the main stem. This pattern can be formed on the plate by casting, forging, or etching. Pattern 52 provides structural integrity and electrical communication across anode 44 to terminal 50 as the metal in plate 48 is consumed. This is important since anode consumption is not always even, and thus holes can develop in the anode causing the anode to fall apart and electrically isolating portions of the anode. In the case where plate 48 has two reaction surfaces, the anode could be laminated with a conductive center core and aluminum alloy plates affixed thereto, forming the reaction surfaces.

As shown in FIGS. 1-4, the pouch cathode 42 is preferably made from two panels 58 and 60 (constituting first and second walls of the pouch 42) of a gas-permeable, electrolyte-impermeable, material joined together at their respective side and bottom edges to form a pouch with an opening therein between the respective top edges of the panels. This material may be a metal foil, such as stainless steel, having a pattern of perforations therein sufficiently large to permit gas to pass through the material and sufficiently small to prevent electrolyte from passing through the material. A suitable material is microporous stainless steel available from Hruden Laboratories of Woodinville, Wash. There are elongated, resilient sealing beads 62 and 64 on the panels 58 and 60, respectively, adjacent to, and extending along, the opening at the top of pouch cathode 42. A clamp 66 is adapted to releasably compress sealing beads 62 and 64 together to close and seal pouch cathode 42. Sealing beads 62 and 64 are sufficiently resilient to accommodate the projecting terminal 50 of anode 44. As shown in FIGS. 2 and 4, the end of the clamp 66 has a slot 68 to accommodate projecting terminal 50 of anode 44. An end cap 70 can be provided to fit over the slotted end of clamp 66, to secure the clamp on the pouch. Clamp 66 can be easily removed from pouch cathode 42 to allow the pouch to be opened to remove the remainder of spent anode, and install a replacement anode.

Pouch cathode 42 has an inlet 72 and an outlet 74 to allow an electrolyte solution to be circulated through cell 40 between anode 44 and pouch cathode 42. Inlet 72 is preferably located generally at the bottom of one end of pouch cathode 42, and outlet 74 is preferably located generally at the top of the other end of the pouch cathode, to cause thorough circulation of the electrolyte solution from inlet 72, up and across cell 40, to outlet 74. As shown in FIGS. 7 and 8, the interior of pouch cathode 42 has a carbonaceous catalytic substrate 76 deposited thereon over an area generally opposite from the reaction surface of anode 44. Substrate 76 is preferably an activated carbonaceous material.

As shown in FIGS. 7, 8, and 9, current collector 78 is provided on the surface of substrate 76. Current collector 78 is a thin layer of conductive material, such as silver or nickel formed on, or embedded in, substrate 76. Current collector 78 could be formed as a printed circuit on substrate 76, for example by chemical etching, photo screening, or hot-foil stamping. Current collector 78 comprising a generally rectangular frame 79 having a terminal 80, thereof and a plurality of filaments 81 inside the frame, radiating generally from the terminal 80. A conductor 82 extends from terminal 80 of current collector 78 to a cathode terminal 84 on the exterior of pouch cathode 42. The current collector 78, carbonaceous catalytic substrate 76, and the portion of panel 58 on which the substrate is deposited constitute a first cathode. The current collector 78, substrate 76, and the portion of panel 60 on which the substrate is deposited constitute a second cathode.

An alternate embodiment 40' of cell 40 is shown in FIG. 8, in which substrate 76 and current collector 78 are provided on both interior sides of pouch cathode 42. A conductor 82 extends from terminal 80 of each current collector 78 to a single cathode terminal 84 on the exterior of pouch cathode 42. This allows the electrochemical reaction to occur on both sides of the anode plate, increasing the reactive surface and thus the current capacity of the cell 40'. However, in this embodiment, it is desirable that anode 44 be substantially flat on both sides, to provide a flat reaction surface.

Figure 11:
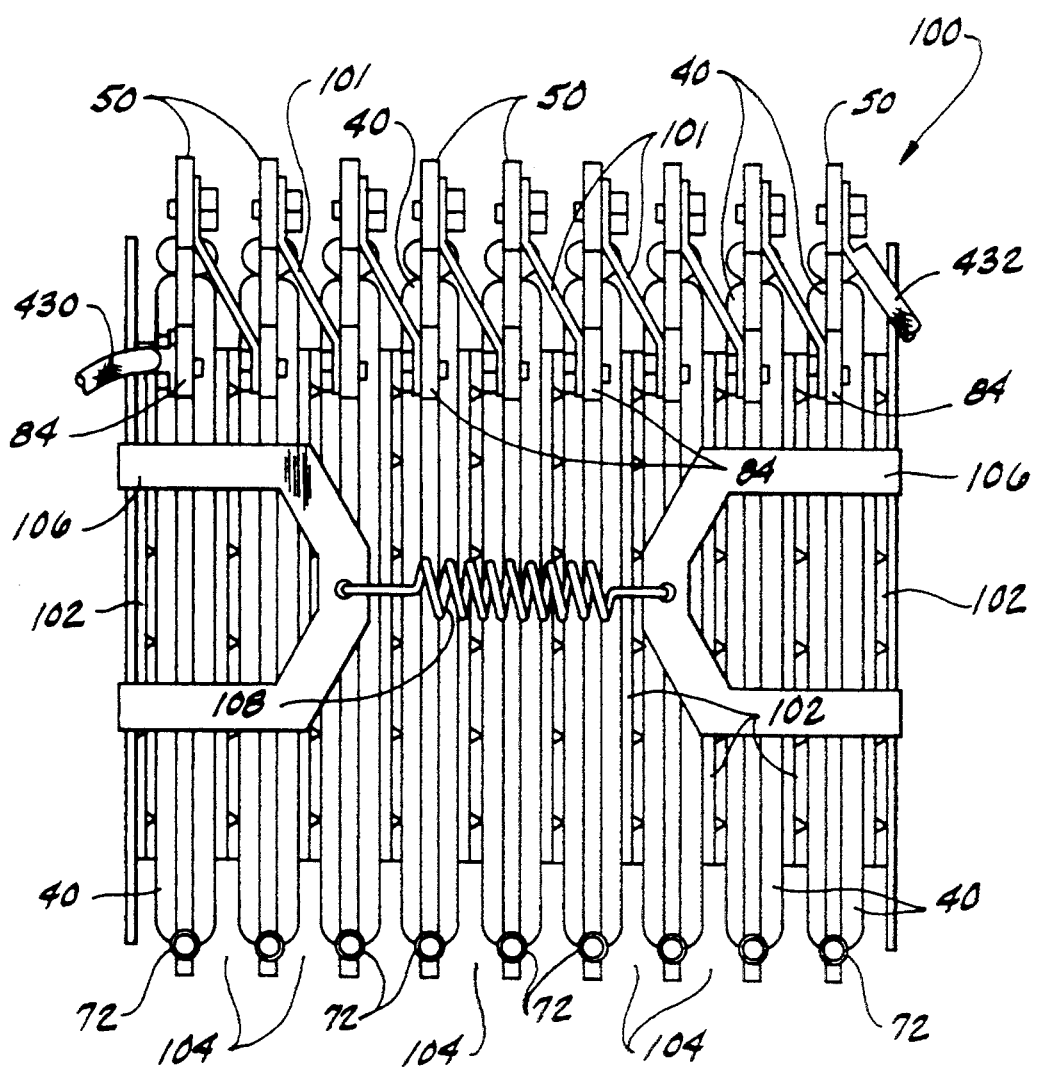
FIG. 11 is a side elevation view of a stack of depleted cell.

A plurality of cells 40 (or 40') can be assembled into a stack 100, as shown in FIGS. 10 and 11. The cells 40 in the stack are electrically connected in series with a plurality of bus straps 101, extending between the cathode terminal 84 of one cell, and the anode terminal 50 of the next adjacent cell. These bus straps 101 can be separate parts, but they are preferably formed integrally with the cathode terminals 84. There is a free anode terminal 50 at one end of the stack, and a free cathode 80 terminal at the other end of the stack, to which connections can be made to draw electric power from stack 100. The individual cells 40 in stack 100 are separated from each other with inter-cell spacers 102 defining spaces 104 between the cells. The spaces 104 allow depolarizing air to circulate around the cells 40 and to the cathodes. The circulation of air around the cells 40 also helps to cool the cells. The thickness of the spacers 102 between the cells 40 may vary, so that the sizes of the spaces 104 between the cells varies to achieve variable cooling of the cells. For example the inter-cell spacing can decrease from one end of the stack to the other, or the inter-cell spacing can decrease from the center of the stack toward the ends of the stack. The thickness of spacers 102 is selected generally to achieve equalization of the temperatures of the cells 40 in stack 100. The entire stack is preferably surrounded by a harness 106, which is preferably resilient, comprising, for example, a spring 108 for tensioning the harness to compress cells 40 in stack 100. The harness could also be formed from resilient cords or some other structure to apply pressure to compress the stack.

The compression by harness 106 presses the walls of pouch cathode 42 tightly against spacers 46 and toward anode 44. The spacers 46 precisely separate the anode and cathode to maintain the predetermined anode-cathode spacing, even as the anode is consumed. As the anodes 44 are consumed, spring 108 continues to compress stack 100 thereby collapsing the pouch 42. Thus, the predetermined spacing between the anode and cathode is maintained substantially throughout the life of each anode within the cell. Compare the stack of depleted cells shown in FIG. 11 with the stack of fresh cells shown in FIG. 10. An indicator 110 (see FIG. 12) can be provided to show the remaining power capacity of the stack 100, which is directly related to the remaining thickness of anodes 44 in cells 40. This indicator may include some mechanical gauge or electromechanical gauge, such as a variable resistor 112, for displaying a measure of the thickness of stack 100, and thus its power capacity.

Figure 12:
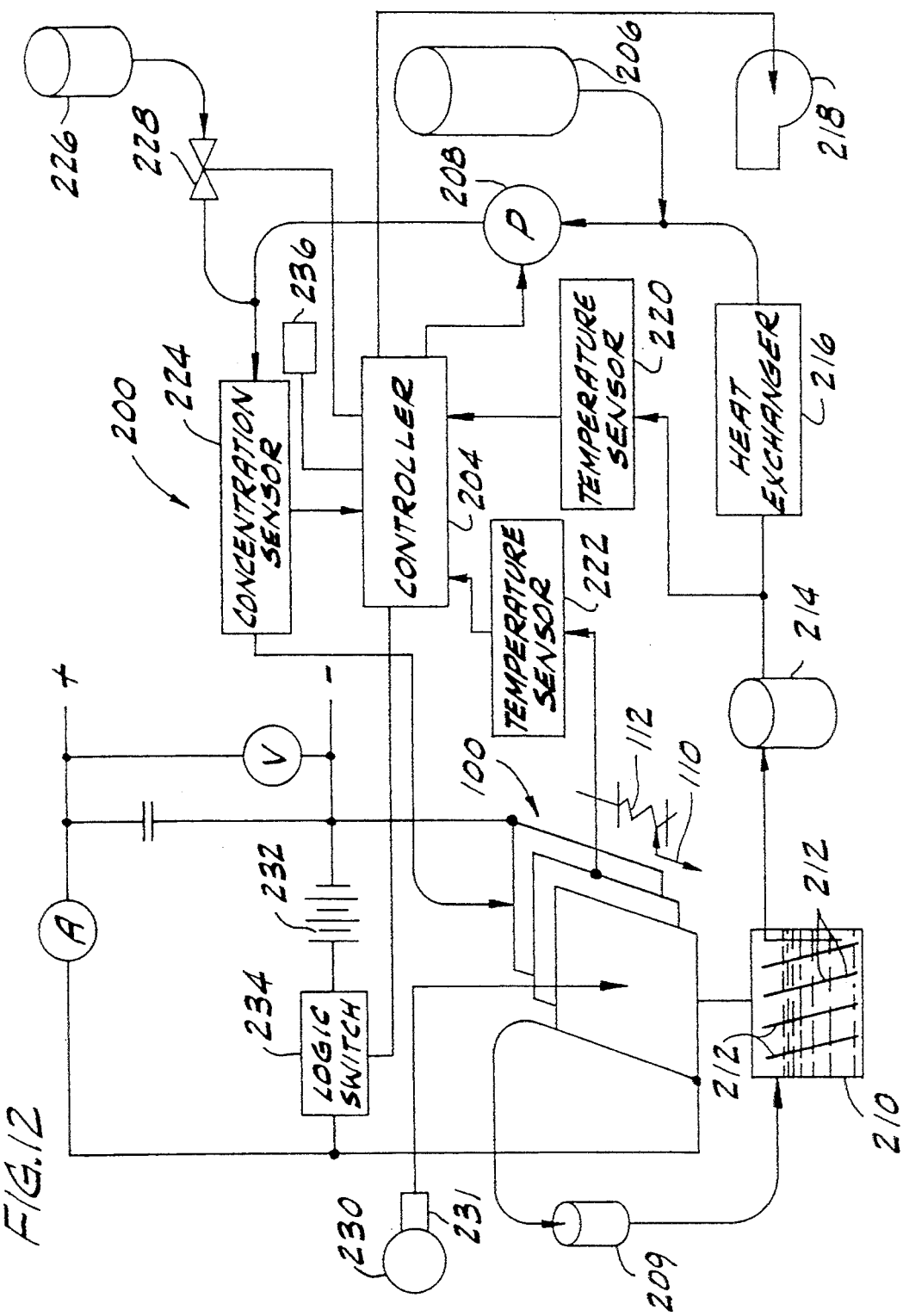
FIG. 12 is a schematic view of a power system constructed according to the principles of this invention.

Stack 100 can be incorporated into a power system 200, shown schematically in FIG. 12. In addition to the stack 100, power system 200 includes a circulatory system 202 for circulating an electrolyte solution through cells 40 in stack 100. Power system 200 preferably includes a controller 204 for controlling the operation of the power system, including the operation of circulatory system 202. This controller 204 is preferably in the form of a microprocessor.

The electrolyte solution for the power system 200 is preferably initially contained in sump 210. Keeping the electrolyte out of the stack when the system is not operating prevents the electrolyte solution from consuming the anode until system 200 is turned on. Sump 210 can also store the electrolyte solution when the power system is turned off after its initial activation. Circulatory system 202 preferably also includes a pump 208 for circulating the electrolyte solution through the circulatory system. Pump 208 is controlled by controller 204, particularly during start-up and shut-down of the power system, as described more completely below, and is preferably reversible.

Circulatory system 202 preferably includes various components for conserving and maintaining the quality of the electrolyte solution. For example, the circulatory system 202 can include a catalytic bed 209 for recombining $H_2$ gas released from stack 100 as the electrochemical process occurs. The catalytic bed combines the free $H_2$ gas with atmospheric oxygen to form water, which is returned to circulatory system 202. Alternatively, or in addition, a vent can be provided to allow $H_2O$ gas to escape, with or without the assistance of from the air pump 230, or fan 218. Circulatory system 202 may also include baffles 212 in the sump 210 for allowing solid reaction products from the electrochemical cell reactions to settle out of the circulating electrolyte solution. The electrolyte solution may be "seeded" with microcrystals of the anticipated reaction products, such as $Al(OH)_3$ in aluminum air cells where the electrolyte is KOH, to cause the reaction products to precipitate out of the electrolyte solution and facilitate the trapping of these products in sump 210. Additional electrolyte solution may be provided in a separate reservoir 206. This solution is introduced into the circulatory system only if and when the electrolyte in sump 210 falls below a minimum acceptable level due to chemical reactions, evaporation, or leakage. An electrolyte filter 214 can also be provided in circulatory system 202 to further cleanse the electrolyte solution.

Figure 13:
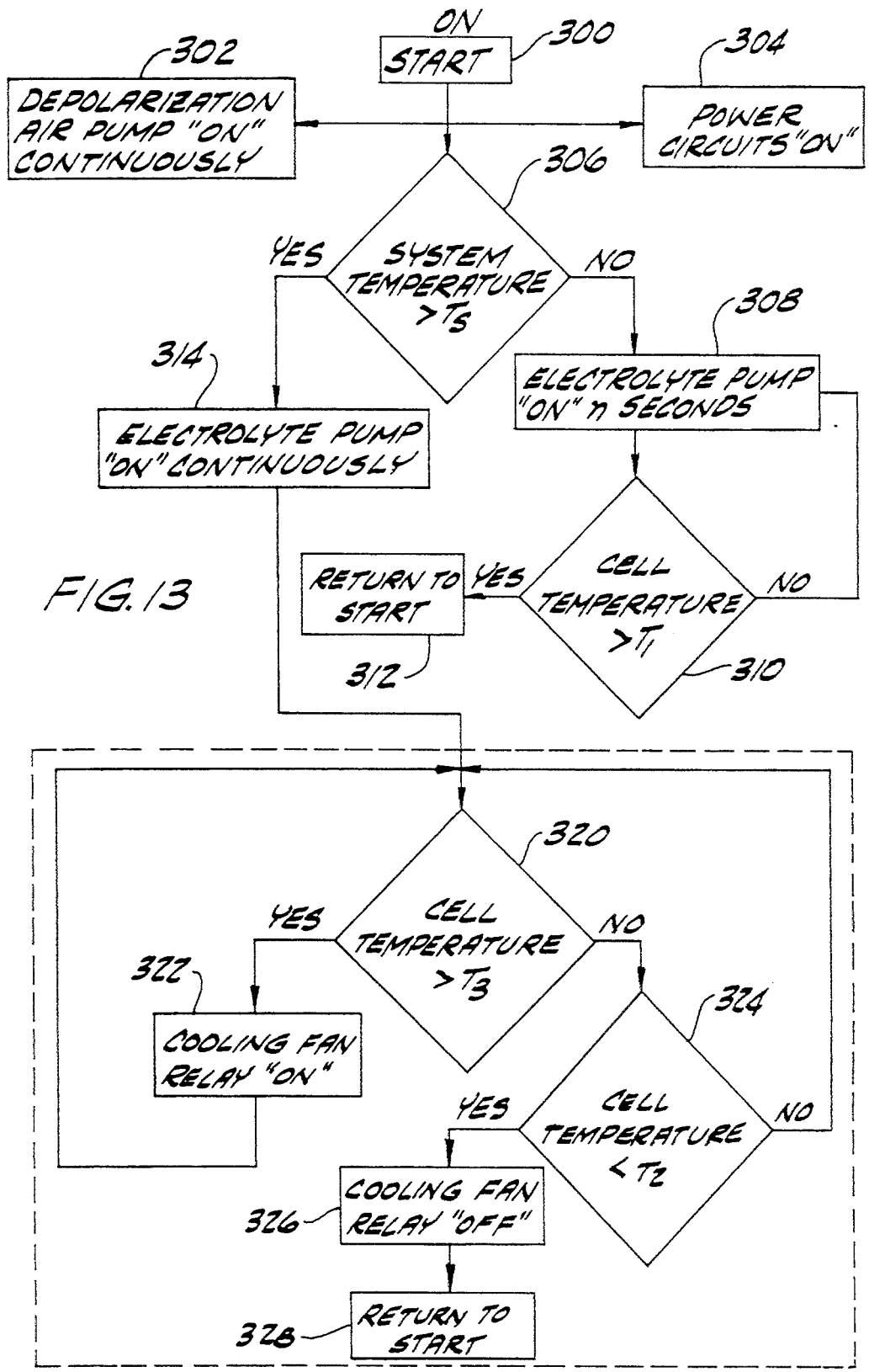
FIG. 13 is a logic diagram of the controller.

Circulatory system 202 also includes a heat exchanger 216 through which the electrolyte solution can circulate, and a cooling fan 218. A first temperature sensor 220 may be provided to sense the temperature of the electrolyte solution in the circulatory system 202. A second temperature sensor 222 can be provided, in addition to, or instead of, sensor 220 to sense the temperature of the electrolyte solution in the cells 40 in stack 100. Controller 204 preferably controls the operation of fan 218 based upon the temperature of the electrolyte solution sensed by sensor 220 and/or sensor 222. The control logic of controller 204 is illustrated in FIG. 13. At block 320, the controller determines whether the temperature of the electrolyte solution (sensed by sensor 220 or 222) is greater or less than a first predetermined temperature $T_3$. If the electrolyte solution temperature is greater than $T_3$ (a "yes" response at block 320), then at block 322 controller 204 turns on cooling fan 218 to cool the electrolyte as it circulates through heat exchanger 216, and control returns to block 320. If the electrolyte solution temperature is not greater than $T_3$ (a "no" response at block 320), then at block 324 the controller determines whether the temperature of the electrolyte solution is less than a second predetermined temperature $T_2$. If the electrolyte solution temperature is less than $T_2$ (a "yes" response at block 324), then at block 326 the controller 204 turns off fan 218, and at block 328 control returns to start block 300, as described in more detail below. If the electrolyte temperature is not less than $T_2$ (a "no" response at block 324), control returns to block 320. Thus, the controller activates fan 218 when the temperature of the electrolyte solution exceeds $T_3$, and keeps the fan on until the temperature of the electrolyte solution drops below $T_2$. The temperatures $T_2$ and $T_3$ are selected to maintain a stable temperature for the electrolyte solution within the optimum operating range of the system.

Circulatory system 202 preferably also includes an electrolyte concentration sensor 224 for sensing the concentration of electrolyte in the electrolyte solution circulating in the circulatory system 202. Sensor 224 may be, for example, a conductivity sensor which measures the conductivity of the electrolyte solution to gauge the electrolyte concentration. Alternatively, sensor 224 could be a pH sensor which measures the pH of the electrolyte solution to gauge the electrolyte concentration. A reserve 226 of concentrated electrolyte is connected to the circulatory system via a solenoid-actuated metering valve 228. Controller 204 controls metering valve 228 in response to electrolyte concentration sensor 224, opening valve 228 to release concentrated electrolyte into the circulatory system to boost the concentration of electrolyte when the sensor detects that the concentration has fallen below a predetermined level C.

Power system 200 also includes an air pump 230 for forcing depolarizing air around cells 40 in stack 100. The circulating air is passed through a filter 231 to remove contaminants, particularly carbon particles, that might contaminate the system. This depolarizing air also helps to cool the cells 40, and the electrolyte solution circulating in the cells.

Power system 200 also includes a supplemental battery 232. This supplemental battery 232 may be, for example, a conventional lead-acid battery. The supplemental battery is normally connected in parallel with stack 100 via controller-controlled switches 244, 246 described in more detail below. The supplemental battery provides the power to start up the power system 200, and to complete shut-down operations after the master switch 236 is turned "off." Supplemental battery 232 may also be sized to provide additional current when current demands on the stack exceed its capacity. The nominally loaded output voltage of stack 100 is slightly higher than the output voltage of battery 232, and thus the stack tends to keep the battery 232 charged under all normal load conditions. However, as current demand on the power system 200 increases suddenly or to a level beyond the rated output of stack 100, output voltage from the stack decreases, and supplemental battery 232 begins to provide current to the load.

Power system 200 is operated with a simple on/off switch 236, which turns on the system by providing power from supplemental battery 232 to controller 204. As noted above, controller 204 controls the operation of power system 200 during start-up, according to the logic diagram of FIG. 13. As shown in FIG. 13, the power system is turned on at block 300. At block 302 air pump 230 is turned on, and at block 304 power circuit is turned on, powered initially by battery 232. At block 306, controller 204 determines whether the temperature of the electrolyte solution in the system (as sensed by sensor 220) is greater than a predetermined minimum starting temperature $T_s$. If the temperature of the electrolyte solution is greater than $T_s$ (a "yes" response at block 306), then at block 314 controller 204 turns on pump 208 to operate continuously. If the temperature of the electrolyte solution is not greater than $T_s$ (a "no" response at block 306), then at block 308 controller 204 turns on pump 208 for a predetermined period of time $t_1$ (n seconds long) sufficient to fill cells 40 with electrolyte from sump 210, and then turns the pump off and waits a second predetermined period of time $t_2$ (m seconds long). At block 310, controller 204 determines whether the temperature of the electrolyte solution in cells 40 (as sensed by sensor 222) is greater than a predetermined temperature $T_1$. If the temperature of the electrolyte solution is not greater than $T_1$ (a "no" at block 310), then control returns to block 308, where controller 204 turns on pump 208 for the predetermined period of time $t_1$ (n seconds) to exchange the electrolyte solution in cells 40, and then turns the pump off, and again waits a second predetermined period of time $t_2$ (m seconds), before control passes to block 310. If the temperature of the electrolyte solution is greater than $T_1$ (a "yes" at block 310), then at block 312 the control returns to start block 300. Thus, controller 204 causes pump 208 to repeatedly pulse on for a period $t_1$ and off for a period $t_2$ to successively fill the cells with electrolyte and allow the electrolyte in the cells to heat up, until the electrolyte solution in the system is brought up to a predetermined minimum starting temperature $T_s$.

This "pulse on" start up by controller 204 causes the electrolyte solution to reach the desired operating temperature more quickly than if the electrolyte were continuously circulated through the cells. Holding the electrolyte substantially static in the cells allows the cells to reach normal power generation much more quickly.

Figure 14:
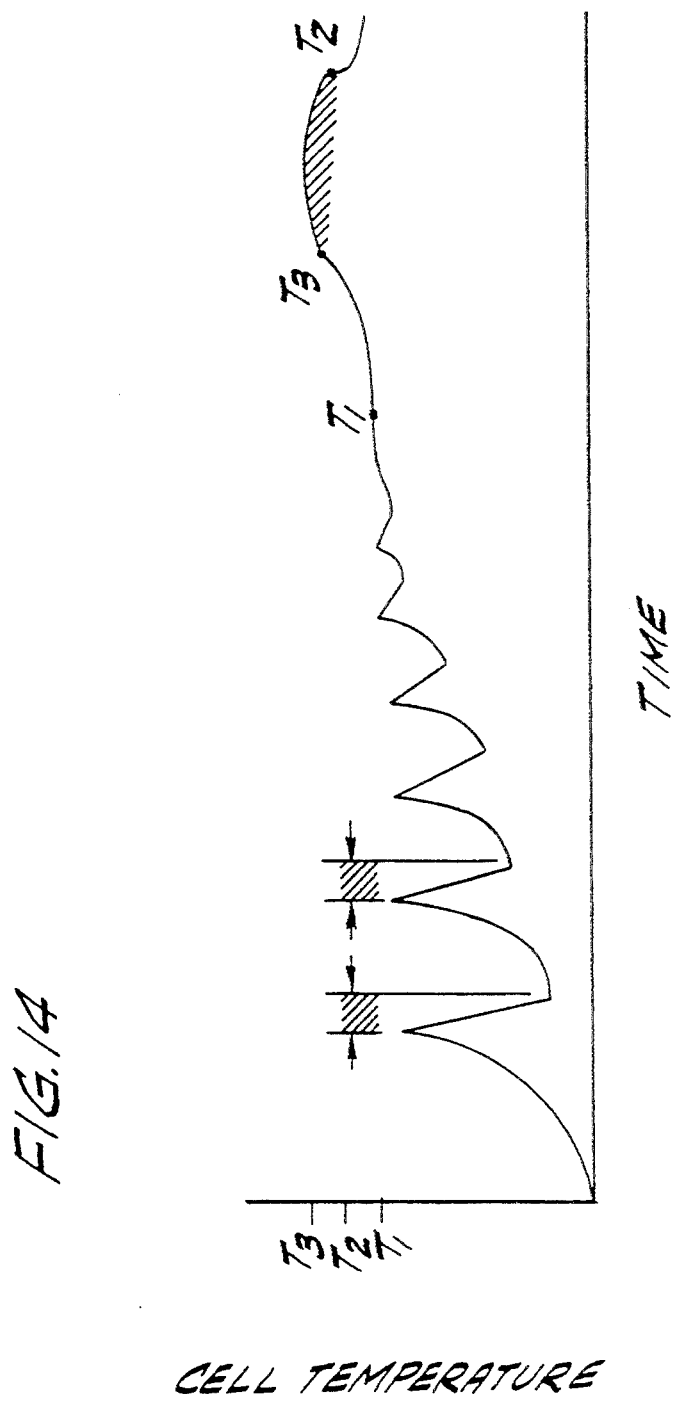
FIG. 14 is a graph of cell temperature versus time during start-up of the power system.

FIG. 14 shows cell temperature versus time for the start-up of power system 200. The graph shows that the temperature in each cell approaches $T_1$, and then drops off sharply as a new charge of electrolyte solution fills the cells. The temperature in each cell again approaches $T_1$ as the new charge is heated, and again drops off sharply as a new charge of electrolyte solution fills the cells. This continues until the temperature of the electrolyte solution on the system reaches $T_S$, after which the pump is continuously on. As described above, when the electrolyte solution temperature reaches $T_3$ the controller turns on cooling fan 218 until the temperature drops below $T_2$, when the controller turns the fan off.

As noted above, controller 204 also controls operation of power system 100 during shut-down. When master switch 236 is manually set so that power system 200 is turned off, controller 204 initially connects supplemental battery 232 across stack 100, applying reverse polarity voltage to inhibit electron flow and thus help protect anodes 44 in cells 40 from further electrochemical erosion. However, if system 200 is not turned on again within a predetermined time $t_3$, then a timing switch within controller 204 opens all stack power circuits and applies reverse power to pump 208 causing electrolyte solution to be drawn out of cells 40 thereby preserving anodes 44 from further consumption.

The power system is preferably constructed so that the stack 100 can be quickly and easily physically disconnected and removed from the rest of system 200. Quick connectors are used to make connections between the circulatory system and the stack, between the air pump and the stack, and between the electrical system and the stack. Thus, when anodes 44 have been consumed, spent stack 100 can be removed, and a replacement stack 100 can be installed. Spent stack 100 can then be replenished by replacing spent anodes 44 in pouch cathodes 42, so that the stack is ready for reuse. In some installations, anodes 44 can be replaced while stack 100 remains installed in system 200.

Figure 17:
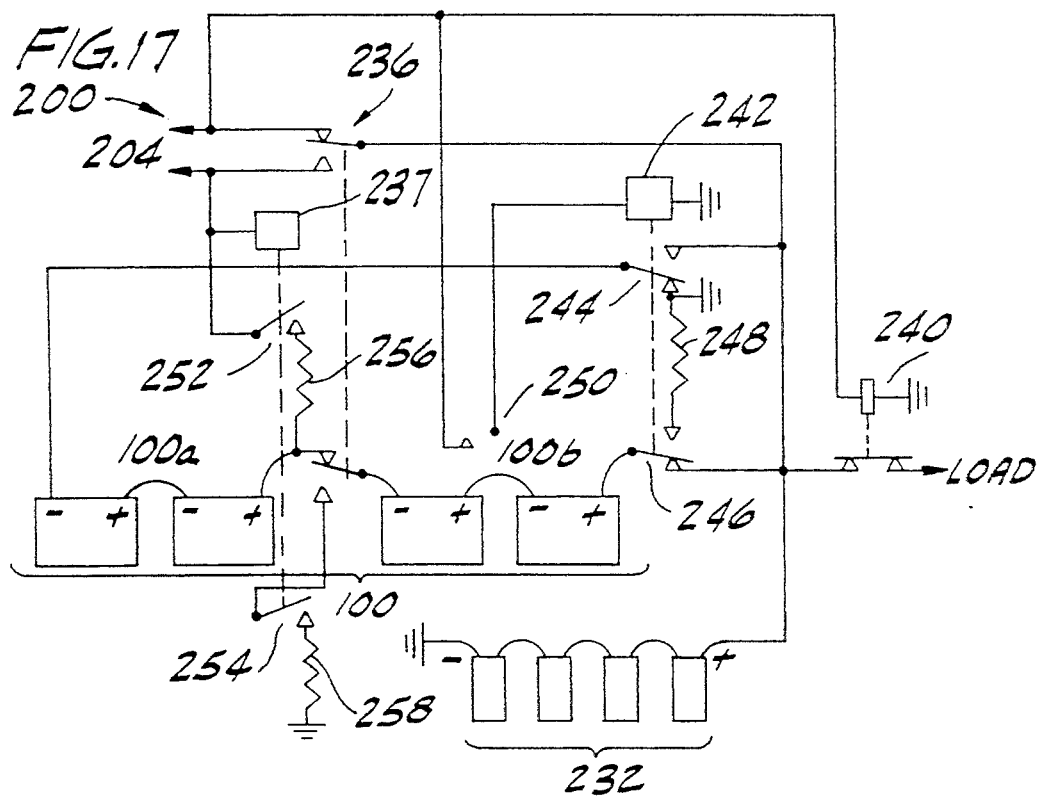
FIG. 17 is a schematic diagram of the power system in the on position.

The start up and shut down of the system, 200 are illustrated in FIGS. 15-18. In FIG. 15, the system 200 is shown in its off position, with no power being supplied to the output. In FIG. 16 the system is shown immediately after the switch 236 has been turned on to turn on system 200. Turning on switch 236 causes power from supplemental battery 232 to be provided to controller 204. Turning on switch 236 also causes solenoid actuated master contactor 240 to connect supplemental battery 232 to the load. Turning on switch 236 also causes switch 238 to close, connecting parts 100a and 100b of stack 100 in series. Finally, turning on switch 236 causes solenoid 242 to reposition switches 244 and 246. The repositioning of switch 244 causes supplemental battery 232 to be connected to stack 100 in series, and the repositioning of switch 246 causes the supplemental battery 232 and stack 100 series to be connected through current-limiting resistor 248 to ground. Thus supplemental battery 232 provides a current, limited by resister 248, to warm up cells 40 in stack 100, and to depassivate the anodes breaking up any films that have formed on the anodes. When the stack has been warmed, normally closed thermal switch 250 opens, de-energizing solenoid 242, and allowing switches 244 and 246 to reposition. As shown in FIG. 17, when switch 244 repositions, it connects the negative terminal of stack 100 to ground; when switch 246 repositions, it connects the positive terminal of stack 100 to the load, in parallel with supplemental battery 232. Supplemental battery 232 and stack 100 can thus provide current to the load in parallel. However, the higher voltage output of stack 100 at up to rated current levels exceeds the voltage of supplemental battery 232, and thus stack 100 usually provides all of the power output and also keeps supplemental battery 232 charged.

Figure 18:
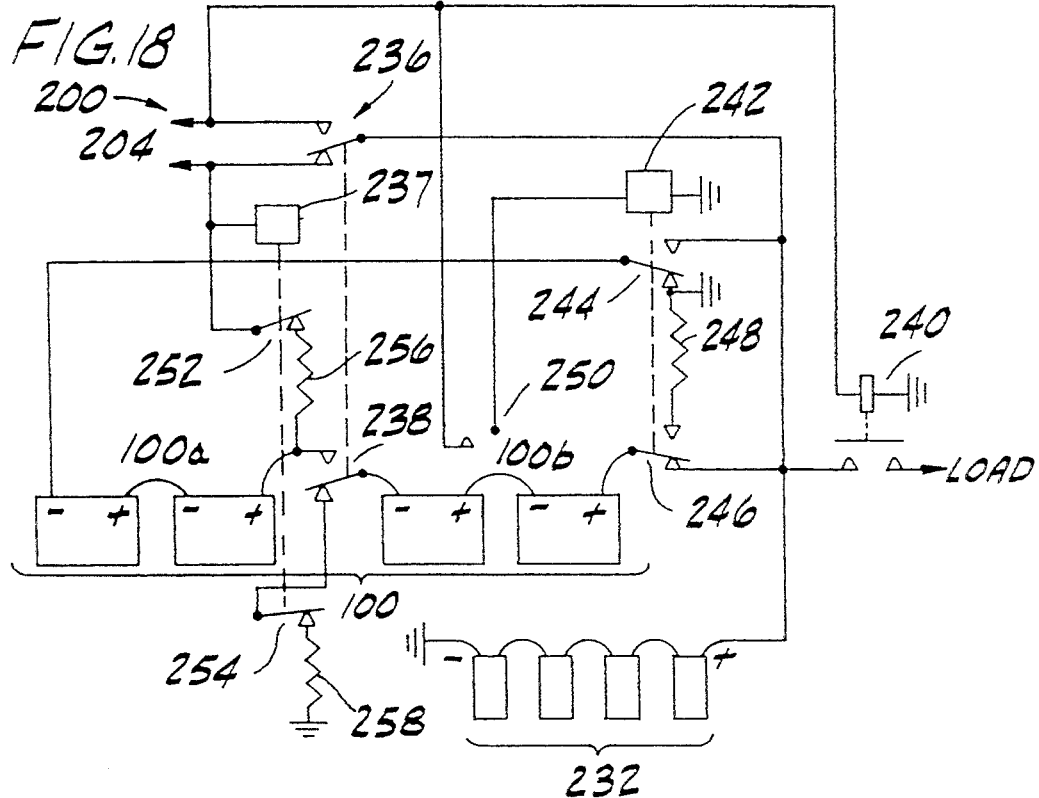
FIG. 18 is a schematic diagram of the power system during initial shut-down, immediately after being turned off.

As shown in FIG. 18, when the system 200 is shut down by turning the switch 236 to the off position, this de-energizes the master contactor 240, shutting off the output power. Turning the switch 236 to the off position also connects the corrosion inhibit timer 237 which temporarily closes normally open switches 252 and 254. Turning off of switch 236 also opens switch 238 separating parts 100a and 100b of stack 100. The closing of switch 252 connects supplemental battery 232 through a current-limiting resistor 256, to the positive terminal of part 100a of stack 100, the negative terminal of which is connected to ground. The closing of switch 254 connects the negative terminal of part 100b of stack 100 through current-limiting resistor 258 to ground, the positive terminal of which is already connected the supplemental battery. So long as the switches 252 and 254 remain closed, the supplemental battery 232 provides positive bias voltage to protect the anodes in parts 100a and 100b of stack 100 from consumption. After a predetermined period, corrosion inhibit timer 237 allows the switches 252 and 254 to open again. Controller 204 then acts to start up pump 208 in reverse to drain the electrolyte into the sump 210, to prevent further consumption of the anodes.

Figure 19:
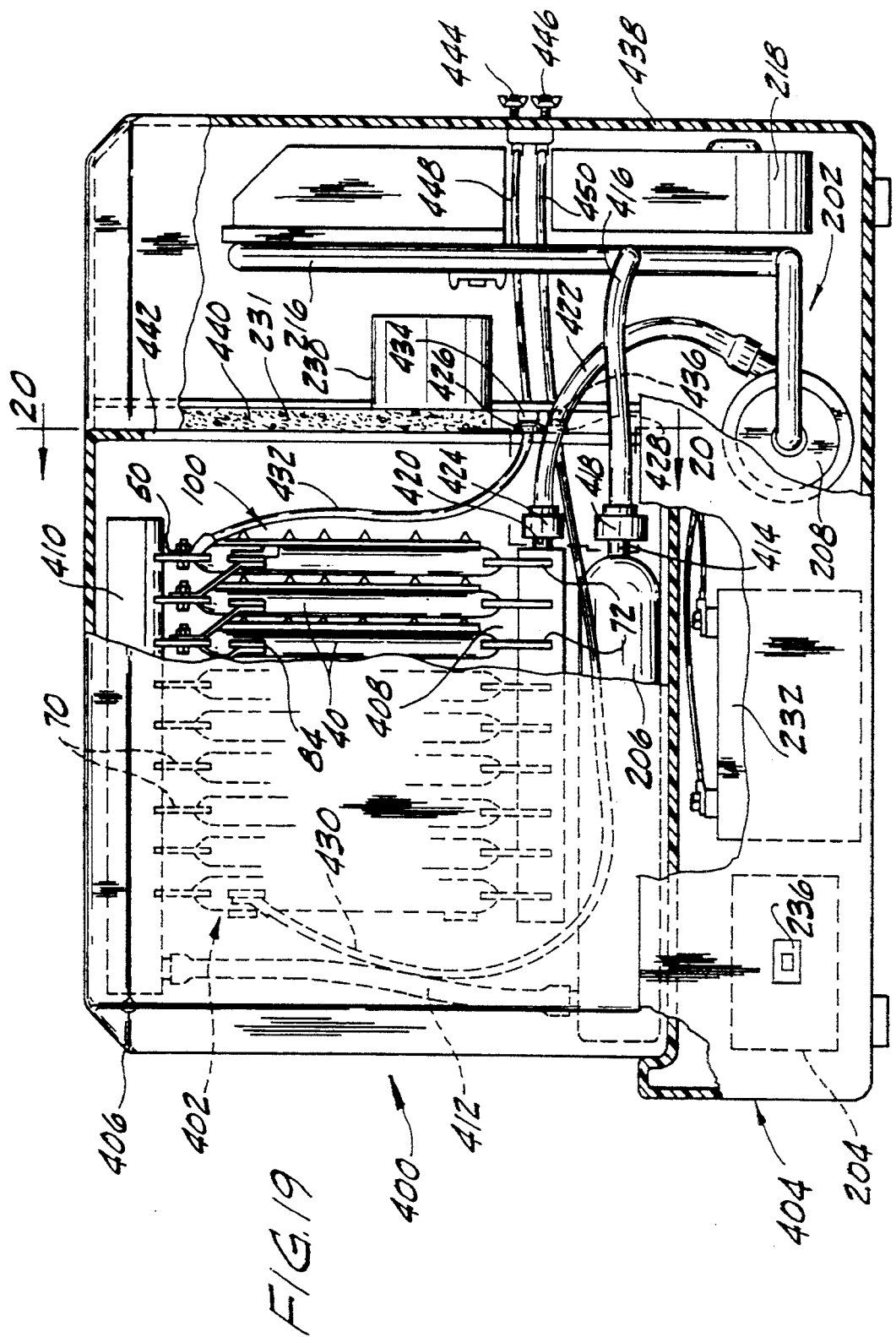
FIG. 19 is an elevation view of an electrochemical power generator system of the present invention with portions broken away to reveal details of construction.
Figure 20:
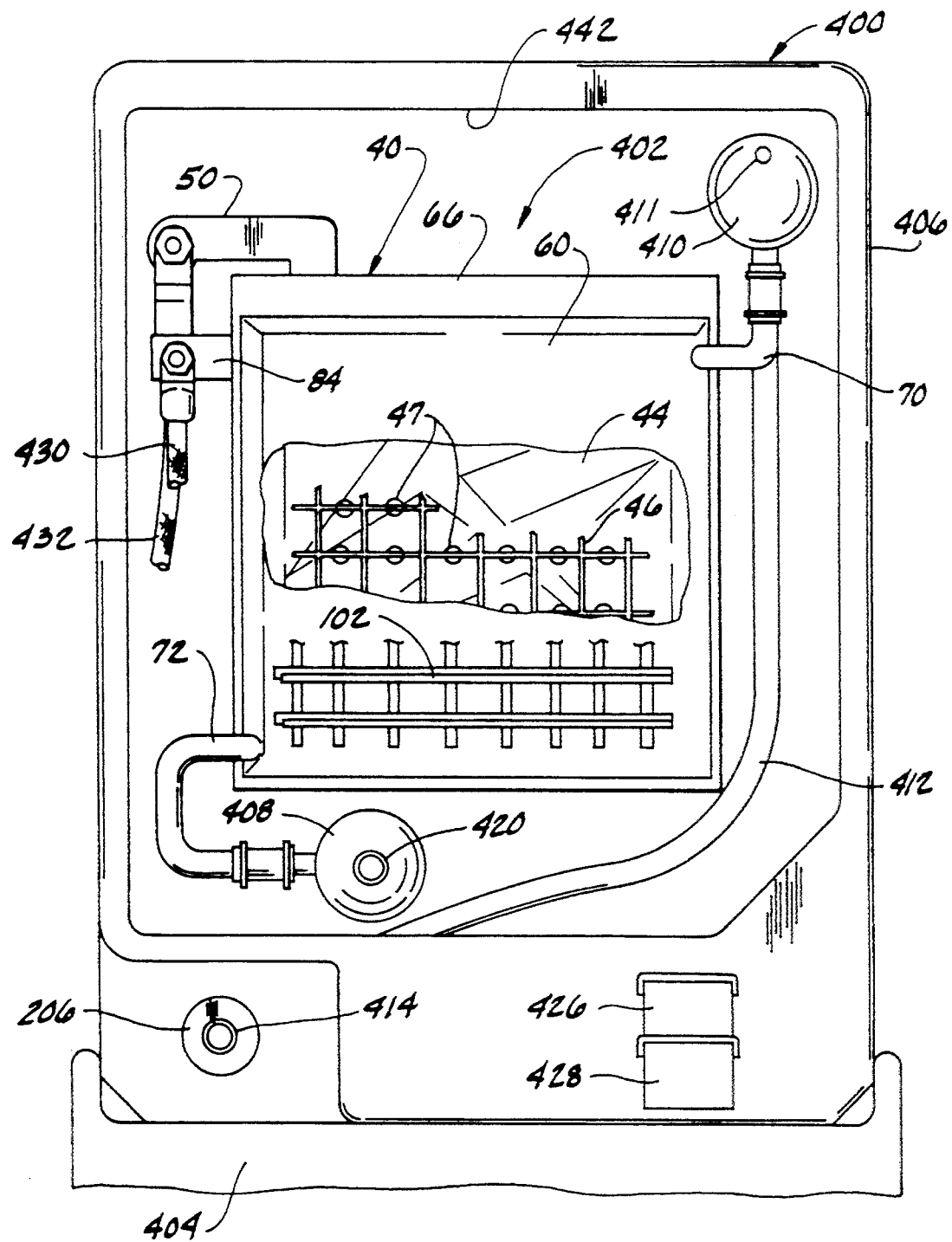
FIG. 20 is a partial cross-sectional view taken along the plane of line 20—20 in FIG. 19.

A physical embodiment of power system 200 is indicated generally as 400 in FIGS. 19 and 20. Power system 400 comprises a replaceable fuel unit 402 and a base unit 404. Fuel unit 402 comprises a housing 406 containing a stack 100 of metal-air cells 40. Inlets 72 of cells 40 in stack 100 are connected to a supply manifold 408. Similarly, outlets 74 of cells 40 in stack 100 are connected to a discharge manifold 410. The connections between inlets 72 and supply manifold 408, and the connections between outlets 74 and discharge manifolds 410 are flexible to accommodate the compression of stack 100 by harness 106 as the anodes are consumed. Discharge manifold 410 may be provided with a vent 411 to vent $H_2$ generated in the cell and entrained in the circulating electrolyte solution. Fuel unit 402 also includes an electrolyte sump 210 connected to discharge manifold 410 by a conduit 412. Electrolyte sump 210 has an outlet 414 to which a conduit 416 from base unit 304 can be connected with a quick-connect connector 418. Supply manifold 408 has an inlet 420 to which a conduit 422 from base unit 404 can be connected with a quick-connect connector 424. Quick-connect connectors 418 and 424 allow circulatory system components in fuel unit 402 to be quickly and easily connected to and disconnected from circulatory system components in base unit 404 to implement replacement of fuel unit 402.

Fuel unit 402 also includes a electrical contact pads 426 and 428. Free anode terminal 50 at one end of stack 100 is connected via cable 432 to negative contact pad 426, and free cathode terminal 84 at the other end of stack 100 is connected via cable 430 to positive contact pad 428. Contact pads 426 and 428 are adapted to make electrical connection with a similar pair of pads 434 and 436 on base unit 404, when fuel unit 402 is mounted on base unit 404.

Base unit 404 comprises a housing 438 adapted to interfit with housing 406 of fuel unit 402. Base unit 404 contains a circulatory system 202 comprising in-line reversible pump 208, one side of which is connected to conduit 422 for connecting pump 208 with discharge manifold 408 in fuel unit 402. The other side of pump 208 is connected to the inlet of heat exchanger 216. The outlet of heat exchanger 216 is connected by conduit 416 to sump 210 via quick connect coupling 418. A cooling fan 218 is mounted in base unit 404 to force air over heat exchanger 216 to cool the electrolyte solution circulating therein.

Base unit 404 also contains an air pump 230 for circulating depolarizing air through a filter 231 and into an opening 442 in housing 406 of fuel unit 402. Depolarizing air from pump 230 circulates around cells 40 in stack 100, depolarizing them, and to some extent cooling them.

As noted above, base unit 404 has electrical contact pads 434 and 436 for engaging electrical contact pads 426 and 428 on fuel unit 302. Base unit 204 also includes supplemental battery 232 normally connected in parallel with stack 100. Base unit has positive and negative terminals 444 and 446, respectively, for connecting a load to power system 400. Cables 448 and 450 extend from contact pads 434 and 436 to terminals 444 and 446, providing electrical energy to the terminals.

Base unit 404 also contains controller 204, for controlling operation of power system 400. When power system 400 is turned on, controller 204 turns on pump 208. If the temperature of the electrolyte solution is less than $T_S$, then controller 204 only turns on the pump for a predetermined time $t_1$, which draws electrolyte from electrolyte sump 210 through conduit 416, and through heat exchanger 216. The electrolyte solution exits heat exchanger 216 and passes through pump 208. Electrolyte exits pump 208 and passes through conduit 416 to supply manifold 408. From supply manifold 408, electrolyte is forced into individual cells 40 in stack 100, eventually filling the cells. Controller 204 turns off pump 208 after $t_1$ and waits for a predetermined period $t_2$. If, after the predetermined period $t_2$ the sensor 222 does not sense that the temperature of the electrolyte in cells 40 has reached a predetermined minimum temperature $T_1$, then controller 204 turns on pump 208 again for a predetermined time $t_1$ to exchange the electrolyte in the cells, and turns pump 208 off again for a predetermined time $t_2$. The controller repeats this cycle of turning pump 208 on for a predetermined time $t_1$ and off for a predetermined time $t_2$, until the electrolyte solution in the cells exceeds $T_1$, at which time the controller checks to determine whether the system temperature exceeds $T_s$. If the system temperature exceeds $T_s$, controller 204 turns on pump 208 to operate continuously; if the system temperature does not exceed $T_s$, the controller resumes the pulse on—pulse off mode of operation until the cell temperature again exceeds $T_1$.

When power system 400 is turned on, controller 204 also turns on air pump 230 in base unit 404 to circulate depolarizing air over cells 40 in stack 100 in fuel unit 402, and connects battery 232 and stack 100 to the output.

When the temperature of the electrolyte solution in the circulatory system 202 reaches a predetermined temperature $T_3$, then controller 204 turns on cooling fan 218. Cooling fan 218 remains on until the temperature of the electrolyte in circulatory system 202 drops below a predetermined temperature $T_2$, at which point controller 204 turns off fan 218.

Power system 400 can include other of the features described above with respect to system 200, such as sensor 224 for sensing when the concentration of the electrolyte in the electrolyte solution drops below a predetermined concentration C, so that controller 204 can operate a solenoid valve to release concentrated electrolyte into the circulatory system, to maintain the quality of the electrolyte solution. Various other components such as supplemental reservoir 206, electrolyte filter 214, can be included in system 400, depending upon its anticipated life.

Lastly, controller 204 controls the shut-down of power system 400 when it is turned off. When power system 400 is initially turned off, controller 204 connects battery 232 across stack 100 with reverse polarity to protect the anodes in the cells 40 from consumption. This holds the power system in a ready state for reactivation if the power system is turned on again. If power system 400 is not turned on again within a predetermined time period $t_3$, controller 204 turns on pump 208 in reverse, to draw electrolyte out of cells 40, through supply manifold 408, back through heat exchanger 216 and into sump 210. After a predetermined time $t_4$, or when cells 40 are substantially empty, controller 204 turns off pump 208.

When anodes 44 in fuel unit 402 have been substantially consumed, fuel unit 402 can simply be disengaged from base unit 404. Contacts 426 and 428 disengage from contacts 434 and 436, quick-connect connectors 418 and 424 are disconnected, and fuel unit 402 is removed, or preferably sent for replenishment of the stack by replacement of spent anodes 44. A new fuel unit is quickly and easily connected to base unit 404, so use of power system 400 can continue.

What is claimed is:

1. A power system comprising a metal-air cell, the metal-air cell including:
    a flexible, collapsible pouch having first and second opposed walls, at least one of which includes an air-permeable and electrolyte-impermeable air cathode;
    a metal anode within the pouch and surrounded thereby and having a first reaction face opposing the cathode; and
    a spacer between the cathode and the reaction face of the anode for preventing the anode from contacting the cathode, the spacer separating the anode and the cathode for maintaining a substantially constant spacing between the anode and cathode as the anode is consumed during operation.

2. The power system according to claim 1, wherein the pouch has an opening with opposed elongate sealing beads adjacent the opening, and a clamp for compressing the sealing beads together to close the opening in the pouch.

3. The power system according to claim 2 further comprising an anode terminal projecting from the anode, and wherein the sealing beads are of sufficient size and resiliency to allow the anode terminal to extend between them to the exterior of the pouch, and wherein the clamp has an opening to accommodate the projecting anode terminal.

4. The power system according to claim 1 wherein the pouch comprises two panels of a gas-permeable, electrolyte-impermeable, material joined together along their edges to form a pouch with an opening therein.

5. The power system according to claim 4, further comprising elongate, resilient sealing beads, one of the beads being on one of panels adjacent the opening of the pouch and another of the beads being on the other panel adjacent the opening of the pouch, and a clamp for compressing the sealing beads together to close the pouch.

6. The power system according to claim 1, further comprising an inlet and an outlet in the pouch to allow an electrolyte solution to be circulated through the cell, between the anode and the cathode.

7. A power system comprising a stack of metal-air cells according to claim 1, a harness surrounding the stack of cells, and a spring for tensioning the harness to compress the stack of cells, to maintain the predetermined anode-cathode spacing determined by the spacers in the cell, as the anode in each cell is consumed.

8. A power system comprising a stack of metal-air cells according to claim 1, and a plurality of air gap spacers between the cells in the stack for separating the cells with an air gap, the air gap spacers being sized so that the size of the air gap between the cells varies.

9. A power system comprising a stack of metal-air cells according to claim 1, and a plurality of air gap spacers between the cells in the stack for separating the cells with an air gap, the air gap spacers being sized so that the size of the air gap between the cells decreases from one end of the stack toward the other.

10. A power system according to claim 1 further comprising a highly conductive terminal extending from the anode, the anode comprising a generally flat metal plate having a first face, a second face, and a raised dendritic pattern protruding from the second face, the dendritic pattern comprising a main stem extending from the conductive terminal substantially across the plate, and a plurality of branches extending from the main stem, the pattern providing structural integrity and electrical communication across the anode plate to the terminal as the metal in the plate is consumed.

11. The power system according to claim 6 further comprising a circulatory system for delivering electrolyte solution to the inlet of the cell, and removing electrolyte solution from the outlet of the cell, the circulatory system including a pump.

12. The power system according to claim 11 wherein the circulatory system includes a heat exchanger through which the electrolyte solution circulates, and further comprising a cooling fan for forcing cooling air over the heat exchanger, a sensor for monitoring the temperature of the electrolyte solution circulating in the circulatory system, and a controller for turning on the fan when the temperature of the electrolyte solution exceeds a temperature $T_3$, and for turning off the cooling fan when the temperature of the electrolyte solution is less than a temperature $T_2$, the temperature $T_3$ being greater than the temperature $T_2$.

13. The power system according to claim 11 further comprising a supplemental battery for connection in parallel with the cell, and sized to provide operating power for the system and supplementary power to the system during periods of peak current demand by an external load.

14. The power system according to claim 13 comprising a controller for temporarily connecting the supplemental battery in series with the cell when the power system is turned on to facilitate start up of the power system.

15. The power system according to claim 11 further comprising a sump in the circulatory system with baffles for trapping solid particles that form in the electrolyte solution.

16. The power system according to claim 11 further comprising an electrolyte filter for removing particles from the electrolyte solution as the electrolyte solution flows through the filter.

17. The power system according to claim 11 further comprising a depolarizing air pump for circulating air to the cathode of the cell.

18. A power system comprising a stack of metal-air cells according to claim 6, and a circulatory system for delivering electrolyte solution to the inlets of the cells, said stack being provided as a separable, replaceable component of the system, and wherein the stack is connected to the circulatory system with quick-connect connectors.

19. The power system according to claim 11 further comprising a temperature sensor for sensing the temperature of the electrolyte solution, and means for selectively energizing the circulatory system as a function of the sensed temperature.

20. The power system according to claim 18 wherein the stack comprises an inlet manifold connected to the inlets of each cell, and an outlet manifold connected to the outlets of each cell, and wherein the connection between the stack and the circulatory system is a connection between the inlet manifold and the circulatory system, and a connection between the outlet manifold and the circulatory system.

21. A power system comprising a first unit including a stack of metal-air cells according to claim 6, and
a second unit, releasably connectable to the first unit, the second unit comprising a circulatory system for delivering electrolyte to the inlets of the cells and removing electrolyte from the outlets of the cells, the circulatory system including a pump, and a controller for controlling the circulatory system.

22. The power system according to claim 21 wherein when the power system is turned off, the controller causes the circulatory system to remove the electrolyte from the cells to conserve the anodes.

23. The power system according to claim 21 wherein the first unit comprises an electrolyte reservoir, and wherein when the first and second units are connected, the circulatory system draws electrolyte from the reservoir in the first unit, and delivers it to the inlets of the cells in the first unit.

24. The power system according to claim 23 wherein when the power system is turned off, the controller causes the circulatory system to draw the electrolyte from the outlets of the cells into the reservoir.

25. The power system according to claim 21 wherein the power system includes a supplemental battery, and wherein the controller is adapted for connecting the supplemental battery across the stack with reverse polarity for a predetermined time when the power system is turned off to inhibit electron flow and so preserve the anodes in the cells.

26. The power system according to claim 25 wherein the controller is adapted to cause the circulatory system to draw the electrolyte from the cells to preserve the anodes if the power system is not turned on again within the predetermined time.

27. The power system according to claim 21 wherein the second unit further comprises a depolarizing air pump for pumping air between the cells in the first unit.

28. The power system according to claim 21 wherein the second unit comprises a secondary battery for powering the second unit, the secondary battery being recharged by the stack.

29. A power system comprising a stack of metal-air cells according to claim 6, and a sealed electrolyte reservoir under compression so that when the seal is broken, the electrolyte is charged into the cells in the stack.

30. The power system according to claim 1 wherein said pouch has an openable top.

31. The power system according to claim 30 further comprising means for releasably closing said top to seal against leakage of electrolyte therethrough.

32. The power system according to claim 31 wherein said means for releasably closing comprises a first sealing bead along a top edge of the first wall, a second sealing bead along a top edge of the second wall, said first bead being engageable with the second bead to seal the top of the pouch.

33. The power system according to claim 32 wherein said means for releasably closing further comprises means for urging the first and second beads against each other.

34. The power system according to claim 33 wherein said means for urging comprises a clamp for compressing the sealing beads together.

35. The power system according to claim 1 wherein the anode comprises a generally flat plate having a first face, a second face and a raised dendritic pattern protruding from the second face for providing structural integrity and electrical communication across the plate, said first face comprising the first reaction face.

36. A power system comprising a row of metal-air cells according to claim 1, and means for urging opposite ends of the row of collapsible cells toward each other thereby to urge the anode and cathode of each cell toward each other so that the spacing between the inner face of the cathode and the reaction face of the anode of each cell remains substantially constant during consumption of the anode.

37. The power system according to claim 1 wherein the pouch is air-permeable and electrolyte-impermeable and the air cathode comprises at least a portion of one of the walls.

38. The power system according to claim 37 wherein the cathode further comprises a current collector and wherein the first wall comprises a substrate carrying the current collector.

39. The power system according to claim 38 further comprising a second air cathode, said second air cathode comprising at least a portion of said second wall and a second current collector, said second wall comprising a second substrate carrying said second current collector.

40. A metal-air cell battery having a row of collapsible metal-air cells arranged in face-to-face relationship and electrically inter-connected, each cell including a flexible, collapsible pouch, a metal anode within the pouch and having a reaction face, an air cathode having an outer face and an inner face with the inner face opposing the reaction face, a spacer between the inner face of the cathode and the reaction face of the anode for preventing the anode from contacting the inner face of the cathode, an electrolyte intake port and an electrolyte discharge port for the pouch for passage of electrolyte through the pouch and between the anode and cathode, said battery further comprising means for urging opposite ends of the row of collapsible cells toward each other thereby to urge the anode and cathode of each cell toward each other so that the distance between the inner face of the cathode and the reaction face of the anode of each cell remains generally constant during consumption of the anode.

41. A metal-air cell battery as set forth in claim 40 wherein the means for urging opposite ends of the row of cells toward each other comprises a resilient harness extending around the row of cells.

42. A metal-air cell battery as set forth in claim 40 further comprising a plurality of inter-cell spacers between adjacent cells in the row of cells for providing air gaps between the adjacent cells.

43. A power system having a first portion including an electrolyte pump and electronic control means for controlling operation of the pump and a separable second portion, said second portion comprising:
- a row of metal-air cells electrically inter-connected together, each cell including a casing, a metal anode within the casing and having a reaction face, an air cathode having an outer face and an inner face with the inner face opposing the reaction face, a spacer between the inner face of the cathode and the reaction face of the anode for preventing the anode from contacting the cathode, an electrolyte intake port and an electrolyte discharge port in the casing for passage of electrolyte through the casing and between the anode and cathode;
- a manifold having an intake port and a plurality of discharge ports in fluid communication with the electrolyte intake ports of the cells so that electrolyte flowing through the manifold is directed through the intake ports of the cells;
- an electrolyte reservoir, said electrolyte reservoir and intake port of the manifold being operatively connectable with the electrolyte pump for fluid communication therewith so that the pump is able to draw electrolyte from the reservoir and force it into the manifold;
- means for operatively connecting the discharge ports of the cells with the reservoir so that electrolyte discharged from the cells flows to the reservoir; and
- said second portion being releasably attachable to the first portion so that the second portion can be quickly attached to and detached from the first portion.

44. A power system as set forth in claim 43 wherein the casing of each cell comprises a flexible, collapsible pouch and wherein the cells are arranged in face-to-face relationship, said power generating system further comprising means for urging opposite ends of the row of cells toward each other so that the distance between the inner face of the cathode and the reaction face of the anode of each cell remains generally constant during consumption of the anode.

45. A power system as set forth in claim 44 wherein the means for urging opposite ends of the row of cells toward each other comprises a resilient harness extending around the row of cells.

46. A power system as set forth in claim 45 further comprising a plurality of flexible conduits for directing electrolyte flowing through the manifold to the intake ports of the cells, each conduit having a first end connected to one of the discharge ports of the manifold and a second end connected to one of the intake ports of the cells.

* * * * *